United States Patent
Marupaduga

(10) Patent No.: US 11,503,522 B1
(45) Date of Patent: Nov. 15, 2022

(54) HANDOVER BASED ON WIRELESS USER EQUIPMENT (UE) CAPABILITIES

(71) Applicant: T-MOBILE INNOVATIONS LLC, Overland Park, KS (US)

(72) Inventor: Sreekar Marupaduga, Overland Park, KS (US)

(73) Assignee: Sprint Communications Company LP, Overland Park, KS (US)

( * ) Notice: Subject to any disclaimer, the term of this patent is extended or adjusted under 35 U.S.C. 154(b) by 177 days.

(21) Appl. No.: 17/102,949

(22) Filed: Nov. 24, 2020

(51) Int. Cl.
*H04W 36/08* (2009.01)
*H04W 36/38* (2009.01)
*H04W 36/00* (2009.01)

(52) U.S. Cl.
CPC ....... *H04W 36/08* (2013.01); *H04W 36/0055* (2013.01); *H04W 36/38* (2013.01)

(58) Field of Classification Search
CPC .. H04W 36/08; H04W 36/0055; H04W 36/38
See application file for complete search history.

(56) References Cited

U.S. PATENT DOCUMENTS

| | | | |
|---|---|---|---|
| 8,699,997 B2 | 4/2014 | Mildh et al. | |
| 9,374,755 B2* | 6/2016 | Yang | H04L 5/001 |
| 9,585,054 B2 | 2/2017 | Ahmad et al. | |
| 9,609,566 B2 | 3/2017 | Himayat et al. | |
| 9,900,832 B2 | 2/2018 | Kim et al. | |
| 10,085,201 B2 | 9/2018 | Ryu et al. | |
| 10,299,178 B2 | 5/2019 | Gunnarsson et al. | |
| 10,560,882 B2 | 2/2020 | Vrzic et al. | |
| 10,887,761 B2* | 1/2021 | Wu | H04W 8/22 |
| 2021/0029605 A1* | 1/2021 | Kadiri | H04W 8/22 |

* cited by examiner

*Primary Examiner* — Chi H Pham
*Assistant Examiner* — Ji-Hae Yea

(57) ABSTRACT

A source access node that is configured to hand over a wireless User Equipment (UE) to a target access node. A radio wirelessly receives a measurement report from the UE that characterizes signal strength for the target access node, the signal strength for the source access node, and UE capabilities for the UE. Baseband circuitry determines to hand over the UE to the target access node based on the measurement report. The baseband circuitry receives UE load information from the target access node that indicates UE loads for the frequency bands of the target access node. The baseband circuitry determines UE capabilities for the overloaded frequency bands. The baseband circuitry transfers handover instructions to the UE that direct the UE to remove UE capabilities for the overloaded frequency bands. The UE updates the UE capabilities list and hands over to a non-overloaded frequency band of the target access node.

20 Claims, 12 Drawing Sheets

HANDOVER BASED ON WIRELESS USER EQUIPMENT (UE) CAPABILITIES

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals over frequency channels with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter Wave (MMW) and Low-Power Wide Area Network (LP-WAN). In some examples, both LTE and 5GNR networks serve the same wireless user device at the same time with an integrated data service called dual-connectivity. A wireless access network that provides dual connectivity simultaneously serves a single user device over multiple wireless links.

Handover in the wireless communication networks comprises transferring wireless communication service for a wireless user device from a source wireless access node to a target wireless access node. The source access node directs the wireless user device to measure signal strength for the source access node and for the target access node. The wireless user device transfers a measurement report to the source access that characterizes the received signal strengths for the source access node and for the target access node. The source access node determines to handover the wireless user device to the target access node based on the signal strengths. The source access node transfers a handover request to the target access node to transfer wireless communication service for the wireless user device to the target access node. If the target access node accepts the request, the source access node directs the wireless user device to attach to the target access node. The wireless user device attaches to the target access node and detaches from the source access node. The target access node exchanges user data for the wireless communication service with the wireless user device.

An Evolved Universal Terrestrial Radio Access Network Dual Connectivity (EN-DC) access node supports dual connectivity and comprises multiple wireless access nodes. A dual connectivity wireless user device that hands over from the source access node to an EN-DC access node may attach to more than one of the multiple wireless access nodes. When wireless user devices attach to the EN-DC node, the EN-DC access node becomes loaded. An increase in load decreases the ability of the EN-DC node to provide wireless communication service to the dual connectivity wireless user device. With the increase in the amount of duel connectivity wireless user devices, the load in EN-DC access nodes has also increased. Consequently, instances of overload in the EN-DC nodes has also increased. The source access node is faced with the problem of trying to hand over dual connectivity wireless user devices to loaded EN-DC nodes. Unfortunately, the source access node does not effectively and efficiently hand over wireless user devices given the increase in load.

TECHNICAL OVERVIEW

A source access node hands over a wireless User Equipment (UE) to a target access node. The source access node comprises a radio and baseband circuitry. The radio wirelessly receives a measurement report from the UE that characterizes signal strength for the target access node, signal strength for the source access node, and UE capabilities for the UE. The radio transfers the measurement report to the baseband circuitry. The baseband circuitry receives the measurement report and determines to hand over the UE to the target access node based on the signal strengths. The baseband circuitry transfers a handover request to the target access node that indicates the UE capabilities. The baseband circuitry receives UE load information from the target access node that indicates UE loads for frequency bands that correspond to the UE capabilities. The baseband circuitry determines which frequency bands of the target access node comprise overloaded frequency bands. The baseband circuitry determines the UE capabilities that are for the overloaded frequency bands. The baseband circuitry generates a handover command and transfers the handover command to the radio. The handover command directs the UE to remove UE capabilities for the overloaded frequency bands from a UE capabilities list and to attach to the target access node. The baseband circuitry transfers network signaling to the target access node to serve the UE. The radio wirelessly transfers the handover command to the UE. The UE updates the UE capabilities list, attaches to the target access node, and transfers the updated UE capabilities list to the target access node. The target access node wirelessly exchanges user data with the UE on a non-overloaded frequency band.

DETAILED DESCRIPTION

Figure 1:
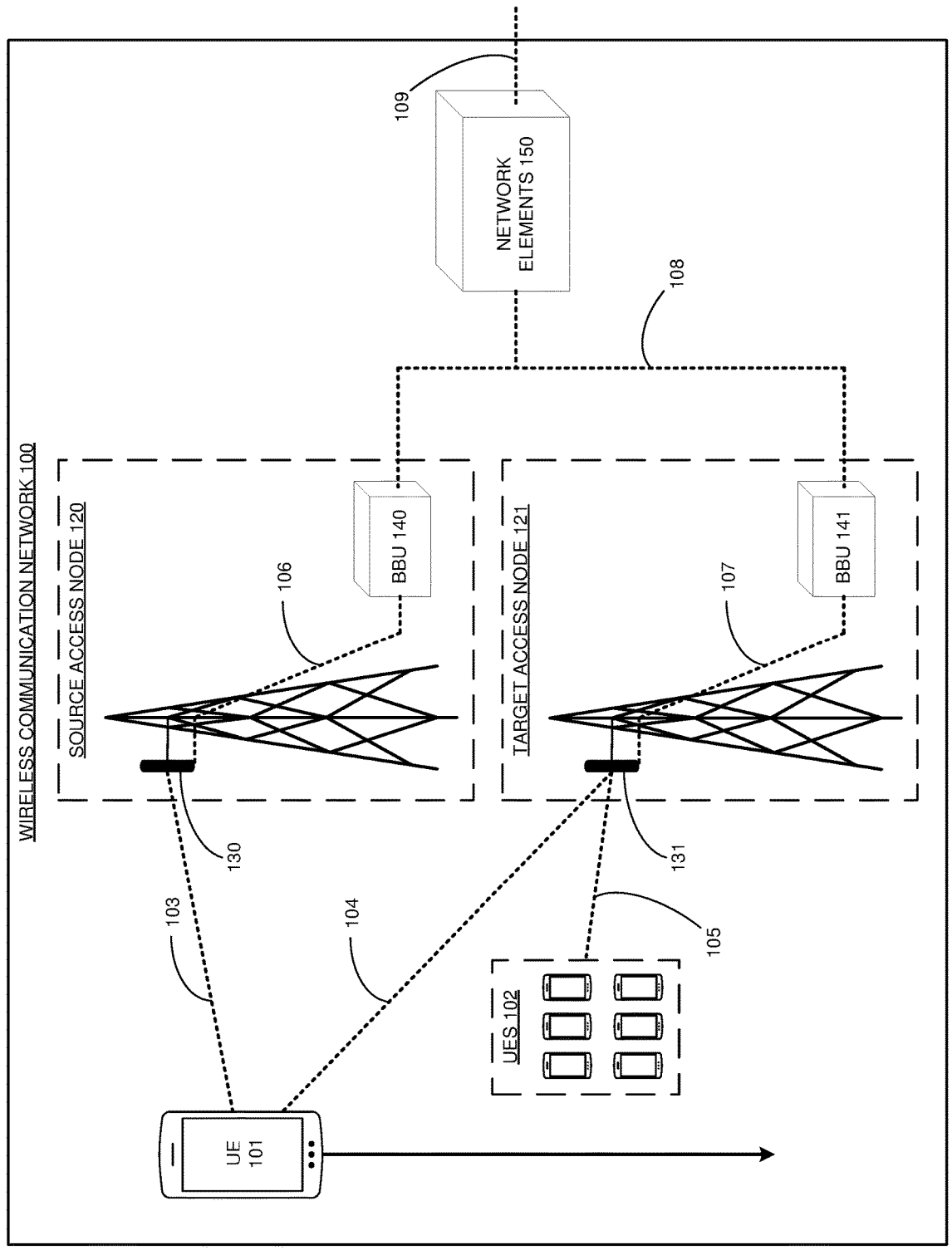
FIG. 1 illustrates a wireless communications network to hand over a wireless User Equipment (UE) based on UE capabilities.

FIG. 1 illustrates wireless communication network 100 to hand over wireless User Equipment (UE) 101 based on UE capabilities. Wireless communication network 100 provides wireless data services to UE 101 like machine-control, internet-access, media-streaming, social-networking, and/or some other type of wireless networking product. Wireless communication network 100 comprises wireless UE 101, UEs 102, links 103-109, source access node 120, target access nodes 121, and network elements 150. Source access node 120 comprises radio 130 and Baseband Unit (BBU) 140. Target access node 121 comprises radio 131 and BBU 141. Target access node 121 serves UEs 102.

Various examples of network operation and configuration are described herein. In some examples, radio 130 wirelessly receives a measurement report from UE 101 that characterizes signal strength for target access node 121, signal strength for the source access node 120, and UE capabilities for UE 101. Radio 130 transfers the measurement report to BBU 140. BBU 140 receives the measurement report and determines to hand over UE 101 to target access node 121 based on the signal strengths. BBU 140 transfers a handover request to target access node 121 that indicates the UE capabilities for UE 101. BBU 140 receives UE load information from target access node 121 that indicates UE loads for the frequency bands of target access node 121 that are for the UE capabilities. For example, the UE load information may comprise the percent of used resource blocks for the different frequency bands of target access node 121. BBU 140 determines which frequency bands of target access node 121 comprise overloaded frequency bands. BBU 140 determines the UE capabilities that are for the overloaded frequency bands. BBU 140 generates a handover command and transfers the handover command to radio 130. The handover command directs UE 101 to remove UE capabilities for the overloaded frequency bands from a UE capabilities list and to attach to target access node 121. BBU 140 transfers network signaling to target access node 121 to serve UE 101. Radio 130 wirelessly transfers the handover command to UE 101. UE 101 updates the UE capabilities list, attaches to target access node 121, and transfers the updated UE capabilities list to target access node 121. Target access node 121 wirelessly exchanges user data with UE 101 on a non-overloaded frequency band based on the updated UE capabilities. Advantageously, source access node 120 effectively and efficiently hands over UE 101 based on the capabilities of UE 101 to prevent UE 101 from attaching to overloaded frequency bands. Moreover, source access node 120 controls the UE capabilities list of UE 101 to prevent loaded frequency bands of target access node 121 from becoming overloaded with wireless UEs.

UEs 101-102 and radios 130-131 comprise antennas, amplifiers, filters, modulation, analog/digital interfaces, microprocessors, software, memories, transceivers, bus circuitry, and the like. BBU 140-141 and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. Although UEs 101-102 are depicted as a smartphones, UEs 101-102 might instead comprise computers, robots, vehicles, or other data appliances with wireless communication circuitry.

Access nodes 120-121 comprise Fifth Generation New Radio (5GNR) gNodeBs, Millimeter Wave (MMW) access nodes, Fifth Generation Radio Access Technology (5G RAT) nodes, Evolved Universal Terrestrial Radio Access Network Dual Connectivity (EN-DC) nodes, 5G EN-DC access nodes, Long Term Evolution (LTE) eNodeBs, WIFI hotspots, Low-Power Wide Area Network (LP-WAN) nodes, and/or some other wireless network apparatus. Access nodes 120-121 are geographically dispersed, however access nodes 120-121 may be collocated. Network elements 150 comprise User Plane Functions (UPFs), Access and Mobility Management Function (AMFs), System Architecture Evolution Gateways (SAE GWs), Mobility Management Entities (MMEs), and/or some other network apparatus. Access nodes 120-121 are depicted as towers, but access nodes 120-121 may use other mounting structures or no mounting structure at all.

Wireless links 103-105 use over-the-air air electromagnetic frequencies in the low-band, mid-band, high-band, or some other portion of the electromagnetic spectrum. Wireless links 103-105 use protocols like 5GNR, LTE, MMW, Institute of Electrical and Electronic Engineers (IEEE) 802.11 (WIFI), LP-WAN, and/or some other format of wireless protocol. Links 106-110 use metal, glass, air, or some other media. Links 106-109 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 103-109 may comprise intermediate network elements like relays, routers, and controllers.

Figure 2:
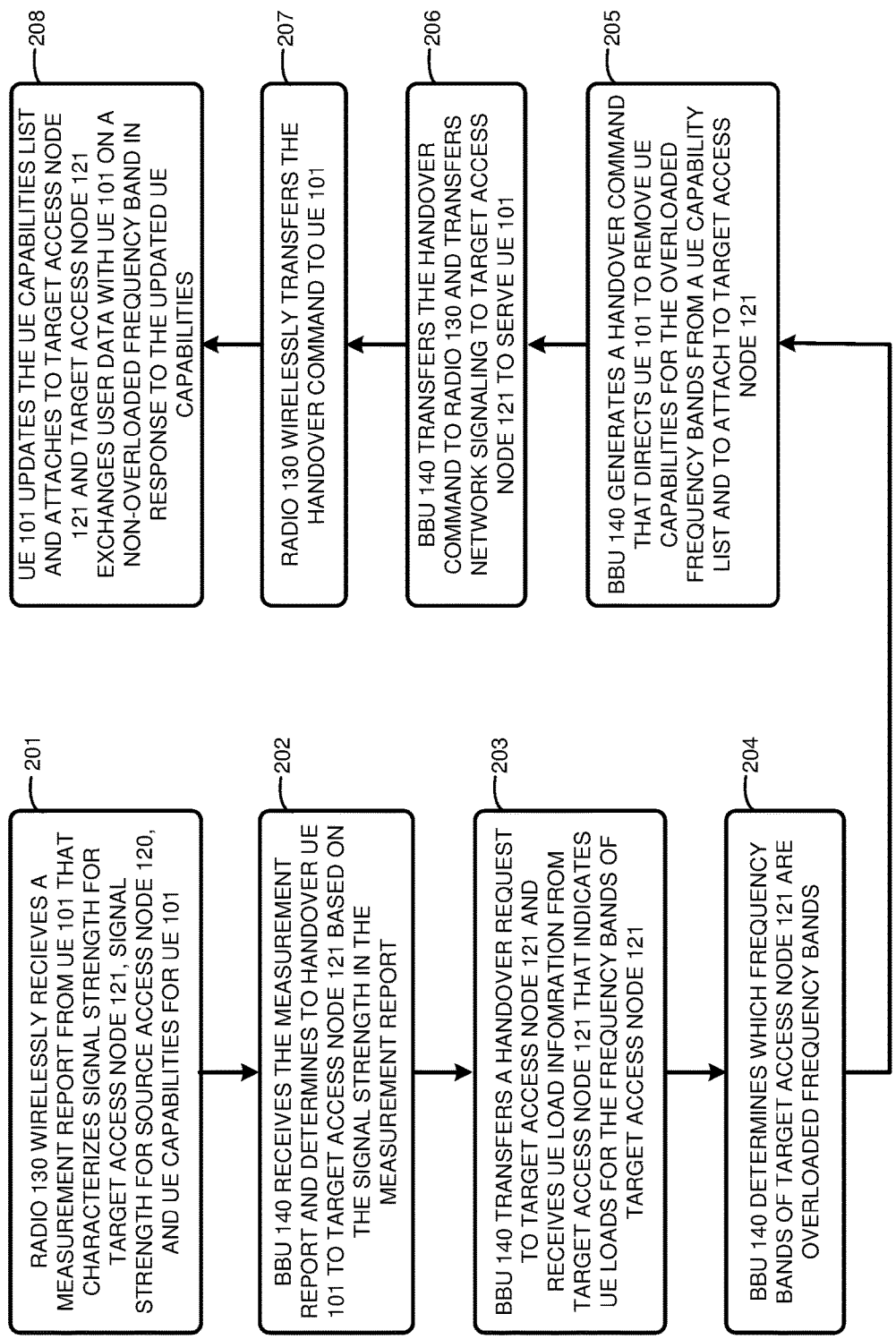
FIG. 2 illustrates an exemplary operation of the wireless communication network to hand over the wireless UE based on UE capabilities.

FIG. 2 illustrates an exemplary operation of wireless communication network 100 to hand over wireless UE 101 based on UE capabilities. In other examples, the operation and structure of wireless communication network 100 may be different. Radio 130 wirelessly receives a measurement report from UE 101 that characterizes signal strength for target access node 121, signal strength for source access node 120, and UE capabilities for UE 101 (201). BBU 140 receives the measurement report and determines to hand over UE 101 to target access node 121 based on the signal strengths in the measurement report (202). For example, BBU 140 may determine the received signal strength for target access node 121 exceeds a handover threshold and the received signal strength for source access node 121 is below a handover threshold. BBU 140 transfers a handover request to target access node 121 and receives UE load information from target access node 121 that indicates UE loads for the frequency band of target access node 121 (203).

BBU 140 determines which frequency bands of target access node 121 are overloaded frequency bands (204). BBU 140 generates a handover command that directs UE 101 to remove UE capabilities for the overloaded frequency bands from a UE capabilities list and to attach to target access node 121 (205). BBU 140 transfers the handover command to radio 130 and transfers network signaling to target access node 121 to serve UE 101 (206). Radio 130 wirelessly transfers the handover command to UE 101 (207). UE 101 updates the UE capabilities list and attaches to target access node 121 and target access node 121 exchanges user data with UE 101 on a non-overloaded frequency band in response to the updated UE capabilities (208).

Figure 3:
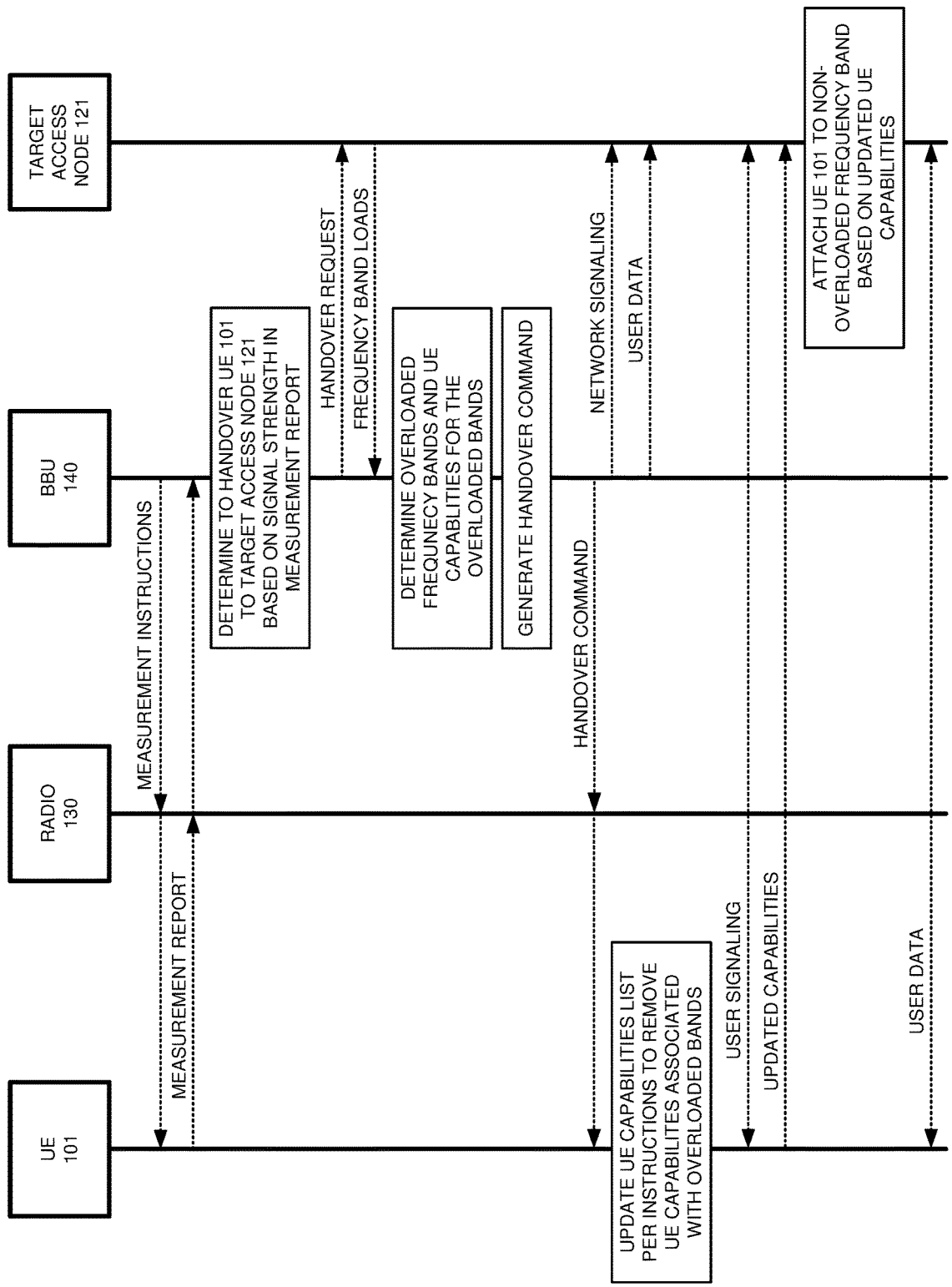
FIG. 3 illustrates an exemplary operation of the wireless communication network to hand over the wireless UE based on UE capabilities.

FIG. 3 illustrates an exemplary operation of wireless communication network 100 to hand over wireless UE 101 based on UE capabilities. In other examples, the operation and structure of wireless communication network 100 may differ. In this example, a UE hands over to a target access node based on UE capabilities and UE loads of the target access node. BBU transfers measurement instructions to UE 101 over radio 130 that direct UE to measure signal strength for source access node 120, target access node 121, and to report its UE capabilities. UE 101 measures the signal strengths and wirelessly transfers a measurement report to BBU 140 over radio 130. The measurement report characterizes signal strength for source access node 120, signal strength for target access node 121, and UE capabilities for UE 101. BBU 140 determines to hand over UE 101 to target access node 121 based on the signal strengths in the measurement report. BBU 140 transfers a handover request to target access node 121 that indicates the UE capabilities of UE 101. Target access node 121 receives the request and responsively transfers UE loads for its frequency bands that correspond to the UE capabilities to BBU 140. Typically, target access node 121 transfers UE load information to BBU 140 over X2 links.

BBU 140 determines which frequency bands of target access node 121 are overloaded. BBU 140 determines which UE capabilities of UE 101 are for the overloaded frequency bands of target access node 121. BBU 140 generates a handover command that directs UE 101 to remove UE capabilities that are for the overloaded frequency bands of target access node 121 and to attach to target access node 121. For example, UE 101 may be able to use one or more overloaded frequency bands of target access node 121 for wireless communication and BBU 140 may direct UE 101 to remove those capabilities from its UE capability list when handing over. BBU 140 transfers the handover command to radio 130. BBU 140 transfers network signaling to target access node 121 to serve UE 101 and forwards user data for UE 101 to target access node 121. Typically, target access node 121 will buffer the user data for UE 101 until UE 101 attaches.

Radio 130 wirelessly transfers the handover command to UE 101. UE 101 updates its UE capabilities list to remove the UE capabilities that are for the overloaded frequency bands of target access node 121. UE 101 exchanges user signaling with target access node 121 to attach to target access node 121 and reports its updated UE capabilities to target access node 121. UE 101 detaches from source access node BBU 140. Target access node 121 attaches UE 101 to a non-overloaded frequency band based on the updated UE capabilities. Target access node 121 wirelessly exchanges user data with UE 101.

Figure 4:
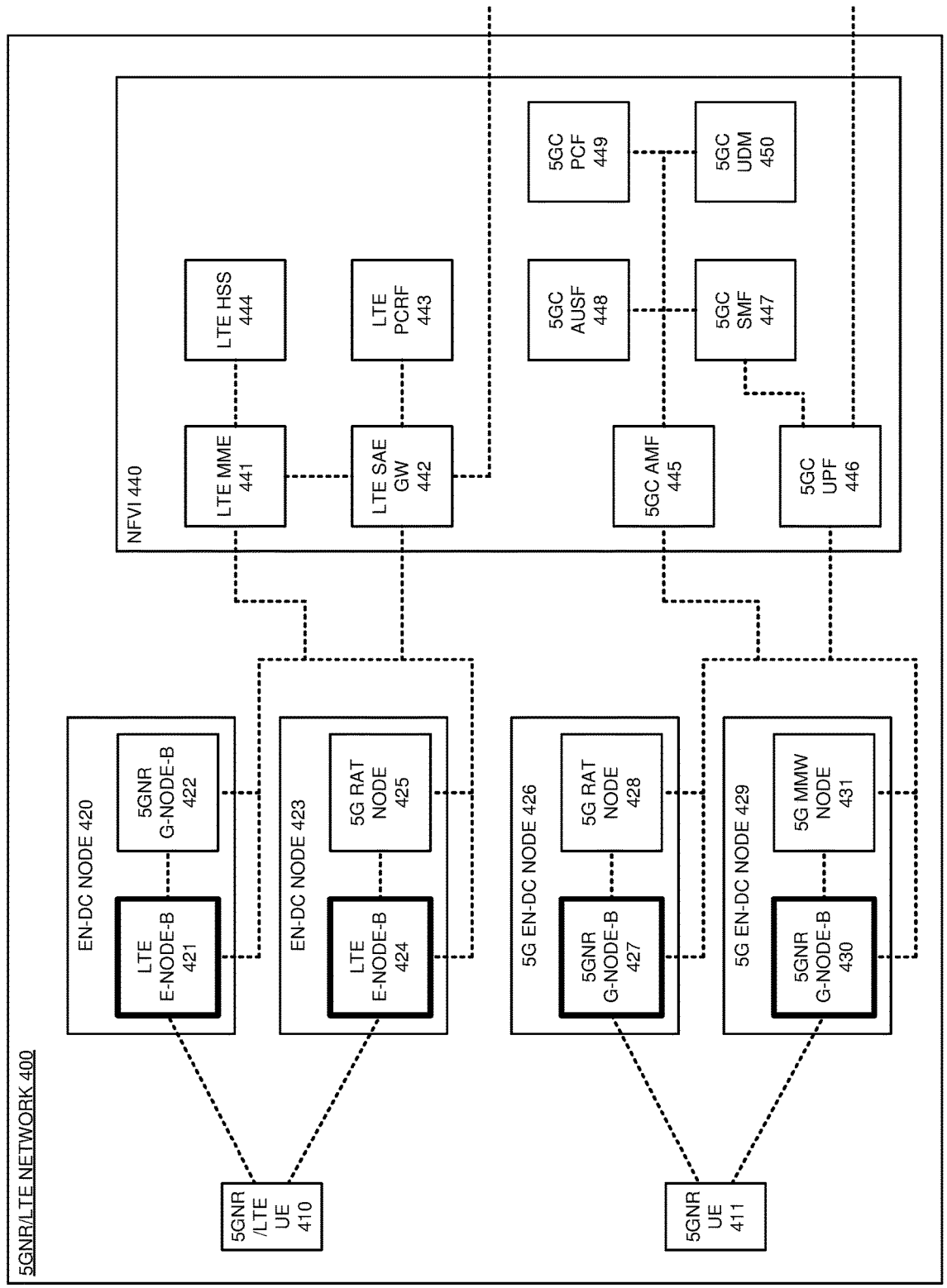
FIG. 4 illustrates a Fifth Generation New Radio (5GNR) Long Term Evolution (LTE) network to hand over wireless UEs based on UE capabilities.

FIG. 4 illustrates Fifth Generation New Radio (5GNR) Long Term Evolution (LTE) network 400 to hand over UEs 410 based on UE capabilities. 5GNR/LTE network 400 is an example of wireless communication network 100, although network 100 may differ. 5GNR/LTE network 400 comprises 5GNR/LTE UE 410, 5GNR UE 411, EN-DC node 420, EN-DC node 423, 5G EN-DC node 426, 5G EN-DC node 429, and Network Function Virtualization Infrastructure (NFVI) 440. EN-DC node 420 comprises LTE eNodeB 421 and 5GNR gNodeB 422. EN-DC node 423 comprises LTE eNodeB 424 and Fifth Generation Radio Access Technology (5G RAT) node 425. 5G EN-DC node 426 comprises 5GNR gNodeB 427 and 5G RAT node 428. 5G EN-DC node 429 comprises 5GNR gNodeB 430 and 5G MMW node 431. NFVI 440 comprises LTE Mobility Management Entity (MME) 441, LTE System Architecture Evolution Gateway (SAE GW) 442, LTE Policy Charging Rules Function (PCRF) 443, LTE Home Subscriber System (HSS) 444, Fifth Generation Core (5GC) Access and Mobility Management Function (AMF) 445, 5GC User Plane Function (UPF) 446, 5GC Session Management Function (SMF) 447, 5GC Authentication and Security Function (AUSF) 448, Policy Control Function (PCF) 449, and 5GC Unified Data Manager (UDM) 450. In some examples, SAE GW 442 may be divided into a Serving Gateway (SGW) and a Packet Data Network Gateway (PGW).

In operation, UE 410 attaches to LTE eNodeB 421 in EN-DC node 420 and UE 410 indicates its UE capabilities. LTE eNodeB 421 requests data service for UE 410 from LTE MME 441 over S1-MME signaling and indicates the UE capabilities of UE 410. LTE MME 441 interacts with HSS 444 to authenticate and authorize LTE/5GNR UE 410 for wireless data services that are represented by Access Point Names (APNs). LTE MME 441 generates a A3 measurement object for 5GNR/LTE UE 410 in response to the UE capabilities and the UE authorization. The A3 measurement object may specify frequency bands for UE 410 to measure when handing over. LTE MME 441 transfers the APNs for UE 410 to SAE GW 442. SAE GW 442 interacts with LTE PCRF 443 to select Quality-of-Service Class Identifiers (QCIs) and network addresses for UE 410 based on the APNs. SAE GW 442 transfers the APNs, QCIs, and network addresses for UE 410 to LTE MME 441. MME 441 transfers the APNs, QCIs, network address, and the A3 measurement object for UE 410 to LTE eNodeB 421. LTE SAE GW 442 exchanges user data for UE 410 with external systems. SAE GW 442 exchanges the user data with LTE eNodeB 421 and with 5GNR gNodeB 422. LTE eNodeB 421 transfers the APNs, QCIs, network address, and the A3 measurement object to UE 410. LTE eNodeB 421 and 5GNR gNodeB 422 exchange the user data with UE 410.

In response to the A3 measurement object, UE 410 measures the signal strength of the reference signal from LTE eNodeB 421 and the signal strength of the reference signal from LTE eNodeB 424. UE 410 generates a measurement report that characterizes the received signal strength of LTE eNodeB 421 and the received signal strength of LTE eNodeB 424. UE 410 wirelessly transfers the measurement report to LTE eNodeB 421. LTE eNodeB 421 determines to hand over UE 410 to LTE eNodeB 424 based on the signal strengths. For example, LTE eNodeB 421 may determine the received signal strength for itself is below a handover threshold and the received signal strength for LTE eNodeB 424 is above a handover threshold and may then determine to hand over UE 410 to LTE eNodeB 424.

LTE eNodeB 421 transfers a handover request to LTE eNodeB 424 to hand over UE 410. The handover request indicates the UE capabilities of UE 410. LTE eNodeB 424 acknowledges the hand over request and transfers UE loads for its frequency bands and the frequency bands of 5G RAT node 425 that correspond to the UE capabilities for UE 410. Typically, LTE eNodeB 424 transfers UE loads to LTE eNodeB 421 over X2-Controll (X2-C) links. However, in some examples, LTE eNodeB 421 and LTE eNodeB 424 may not be able to establish an X2 connection and may instead utilize LTE MME 441 to perform an S1 handover to transfer the handover request and the UE loads for the frequency bands. LTE eNodeB 421 determines which frequency bands for LTE eNodeB 424 and 5G RAT node 425 are overloaded. For example, LTE eNodeB 421 may determine the fraction of consumed resource blocks in each of the frequency bands for LTE eNodeB 424 and 5G RAT node 425 and determine if the faction of consumed resource blocks exceeds a consumed resource block threshold. LTE eNodeB 421 determines which of the UE capabilities correspond to the overloaded frequency bands of LTE eNodeB 424 and 5G RAT node 425. For example, LTE eNodeB 421 may determine that UE has 5G RAT capabilities and that the frequency bands of 5G RAT node 425 are heavily loaded.

LTE eNodeB 421 transfers a handover command to UE 410 that directs UE 410 to attach to LTE eNodeB 424 and update its UE capabilities list to remove UE capabilities for the overloaded frequency bands of LTE eNodeB 424 and 5G RAT node 425. LTE eNodeB 421 directs LTE eNodeB 424 to serve UE 410 and transfers user data for UE 410 to LTE eNodeB 424. LTE eNodeB 424 buffers the user data received from LTE eNodeB 421. UE 410 updates its UE capabilities list in response to the handover command. UE 410 detaches from LTE eNodeB 421 and 5GNR gNodeB 422. UE 410 attaches to LTE eNodeB 424 and reports its updated UE capabilities to LTE eNodeB 424. In response to the updated UE capabilities, LTE eNodeB 424 attaches UE 410 to non-overloaded frequency bands of itself and 5G RAT node 425. LTE eNodeB 424 transfers the buffered user data to UE 410. LTE eNodeB 424 notifies MME 441 of the handover. LTE MME 441 directs LTE SAE GW 442 to serve UE 410 over LTE eNodeB 424 and 5G RAT node 425. In response, LTE SAE GW 442 exchanges user data for UE 410 with LTE eNodeB 424 and 5G RAT node 425. LTE eNodeB 424 and 5G RAT node 425 exchange the user data with UE 410 on the non-overloaded frequency bands.

In some examples, LTE eNodeB 421 hands over UE 410 to LTE eNodeB 424 based on the power head room of UE 410. Power head room comprises the difference between a UE's current output power and the UE's maximum output power. LTE eNodeB 421 directs UE 410 to measure received signal strength for LTE eNodeB 421 and for LTE eNodeB 424 and to report its power head room. LTE eNodeB 421 receives a measurement report from UE 410 that characterizes the signal strengths of LTE eNodeB s 421 and 424 and the power head room for UE 410. LTE eNodeB 421 determines to hand over UE 410 and transfers a handover request to LTE eNodeB 424. LTE eNodeB 424 acknowledges the hand over request and transfers frequency band sizes for each of its frequency bands to LTE eNodeB 421. LTE eNodeB 421 determines which frequency bands of LTE eNodeB 424 and 5G RAT node 425 have a high channel bandwidth. For example, LTE eNodeB 421 may determine a bandwidth threshold and determine which frequency bands exceed the bandwidth threshold to determine which bands have a high bandwidth.

When the power head room of UE 410 is low, LTE eNodeB 421 transfers a handover command to UE 410 directing UE 410 to attach to LTE eNodeB 424 and to remove UE capabilities for frequency bands of LTE eNodeB 424 and 5G RAT node 425 that have a high channel bandwidth. UE 410 attaches to LTE eNodeB 424 and reports its updated UE capabilities to LTE eNodeB 424. LTE eNodeB 424 notifies LTE MME 441 of the handover and LTE MME 441 directs SAE GW 442 to serve UE 410 over LTE eNodeB 424 and 5G RAT node 425. In response, LTE SAE GW 442 exchanges user data for UE 410 with LTE eNodeB 424 and 5G RAT node 425. LTE eNodeB 424 and 5G RAT node 425 serve UE 410 on a frequency band that has a low bandwidth based on the updated UE capabilities.

In some examples, UE 410 determines to remove UE capabilities from its UE capabilities list as done by LTE eNodeB 421. UE 410 wirelessly receives System Information Blocks (SIBs) broadcast from LTE eNodeB 424. The SIBs characterize UE loads for the available frequency bands of EN-DC access node 423. UE 410 determines which frequency bands of EN-DC access node 423 are overloaded based on the percentage of used resource blocks in each of the available frequency bands. When UE 410 receives a handover command from LTE eNodeB 421 to handover to LTE eNodeB 424, UE 410 updates its UE capabilities list to remove UE capabilities for the overloaded frequency bands of EN-DC access node 423. UE 410 attaches to LTE eNodeB 424 and detaches from EN-DC access node 420. UE 410 reports its updated UE capabilities for the non-overloaded bands of EN-DC access node 423 to LTE eNodeB 424. LTE eNodeB 424 and 5G RAT node 425 exchange user data with UE 410 on non-overloaded frequency bands based on the updated UE capabilities.

Note that 5GNR gNodeB 430 and 5G RAT MWM node 431 use different types of 5G Radio Access Technology (RAT). The different types of 5G RAT may have different frequency channel sizes, frequency levels, resource block time intervals, and resource block bandwidths. For example, 5GNR gNodeB 430 may provide an enhanced voice calling service with unique time intervals and bandwidths while 5G MMW node 431 may provide an enhanced video broadcast service with unique time intervals and bandwidths while. Some 5GNR UEs are not capable of using each type of 5G technology from 5GNR gNodeB 430 and 5G MMW node 431, but 5GNR UE 411 is capable of using each type of 5G RAT.

5GNR UE 411 attaches to 5GNR gNodeB 427 and indicates its UE capabilities. 5GNR gNodeB 427 requests data service from 5GC AMF 445 and indicates the capabilities of UE 411 to 5GC AMF 445 over N2 signaling. 5GC AMF 445 interacts with 5GC SMF 447, 5GC AUSF 448, 5GC PCF 449, and 5GC UDM 450 to authenticate and authorize 5GNR UE 411 for data services. 5GC AMF 445 generates a 5GNR measurement object in response to the UE capabilities and the 5G authorization. The 5GNR measurement object may specify frequency bands for UE 411 to measure when handing over or other parameters for UE 411 to hand over. 5GC AMF 445 transfers quality-of-service metrics, network addressing, and the 5GNR measurement object for UE 411 to 5GNR gNodeB 427 and 5GC SMF 447. 5GC SMF 447 directs 5GC UPF 446 to serve UE 411 per the quality-of-service metrics and network addressing over 5GNR gNodeB 427 and 5G RAT node 428. 5GNR gNodeB 427 transfers the selected quality-of-service metrics, network addresses, and 5GNR measurement object to UE 411. 5GNR gNodeB 427 and 5G RAT node 428 exchanges user data with UE 411.

In response to the 5GNR measurement object, UE 411 measures the signal strength of the reference signal from 5GNR gNodeB 427 and the signal strength of the reference signal from 5GNR gNodeB 430. UE 411 generates a measurement report that characterizes the received signal strength of 5GNR gNodeB 427 and the received signal strength of 5GNR gNodeB 430. UE 411 wirelessly transfers the measurement report to 5GNR gNodeB 427. 5GNR gNodeB 427 determines to hand over UE 411 to 5GNR gNodeB 430 based on the signal strengths. For example, 5GNR gNodeB 427 may determine the received signal strength for itself is below a handover threshold, determine the received signal strength for 5GNR gNodeB 430 is above a handover threshold, and determine to hand over UE 411 based on the threshold values.

5GNR gNodeB 427 transfers a handover request to 5GNR gNodeB 430 to hand over UE 411. The handover request indicates the UE capabilities for UE 411. 5GNR gNodeB 430 acknowledges the hand over request and transfers UE loads for its frequency bands and the frequency bands of 5G MMW node 431 that correspond to the UE capabilities.

Typically, 5GNR gNodeB 430 transfers the UE loads to 5GNR gNodeB 427 over X2-Controll (X2-C) links. However, in some examples 5GNR gNodeB 427 and 5GNR gNodeB 430 may not be able to communicate over X2 links and may instead utilize 5GC AMF 445 to transfer the handover request and UE loads. 5GNR gNodeB 427 determines which frequency bands of 5GNR gNodeB 430 and 5G MMW node 431 are overloaded frequency bands. For example, 5GNR gNodeB 427 may determine the fraction of consumed resource blocks in each of the frequency bands, determine if the faction of consumed resource blocks exceeds a resource block threshold, and determine the overloaded frequency bands based on the exceeded thresholds. 5GNR gNodeB 427 determines which of the UE capabilities correspond to the overloaded frequency bands of 5GNR gNodeB 430. For example, 5GNR gNodeB 427 may determine that UE 411 has MMW capabilities and that the frequency bands of 5G MMW node 431 are overloaded.

5GNR gNodeB 427 wirelessly transfers a handover command to UE 411 that directs UE 411 to update its UE capabilities list to remove UE capabilities for the overloaded frequency bands of 5GNR gNodeB 430 and of 5G MMW node 431 and to attach to 5GNR gNodeB 430. 5GNR gNodeB 427 directs 5GNR gNodeB 430 to serve UE 411. 5GNR gNodeB 427 transfers user data for UE 411 to 5GNR gNodeB 430. 5GNR gNodeB 430 buffers the user data received from 5GNR gNodeB 427. UE 411 updates its UE capabilities list. UE 411 detaches from 5GNR gNodeB 427 and 5G RAT node 428. UE 411 attaches to 5GNR gNodeB 430 and transfers its updated UE capabilities to 5GNR gNodeB 430. 5GNR gNodeB 430 transfers the buffered user data to UE 411. 5GNR gNodeB 430 notifies 5GC AMF 445 of the attachment. 5GC AMF 445 directs 5GC SMF 447 to direct 5GC UPF 446 to serve UE 411 per the quality-of-service metrics and network addressing over 5GNR gNodeB 430 and 5G MMW node 431 5GNR gNodeB 430 attaches UE 411 to non-overloaded frequency bands of 5GNR gNodeB 430 and 5G MMW node 431 based on the updated UE capabilities. 5GNR gNodeB 430 and 5G MMW node 431 exchange user data with UE 411.

In some examples, 5GNR gNodeB 427 hands over UE 411 to 5GNR gNodeB 430 based on the power head room of UE 411. Power head room comprises the difference between a UE's current output power and maximum output power. 5GNR gNodeB 427 directs UE 411 to measure received signal strength for 5GNR gNodeB 427 and 5GNR gNodeB 430 and to report its power head room. 5GNR gNodeB 427 receives a measurement report from UE 411 that characterizes the signal strengths of 5GNR gNodeB 427 and 5GNR gNodeB 430 and the power head room for UE 411. 5GNR gNodeB 427 determines to hand over UE 411 based on the signal strengths and transfers a hand over request to 5GNR gNodeB 430. 5GNR gNodeB 430 acknowledges the hand over request and transfers frequency band sizes for each of its frequency bands and the frequency bands of 5G MMW node 431 to 5GNR gNodeB 427. 5GNR gNodeB 427 determines which frequency bands of 5GNR gNodeB 430 have a high channel bandwidth. For example, 5GNR gNodeB 427 may determine a frequency bandwidth threshold and which of the frequency bands exceed the frequency bandwidth threshold.

When the power head room of UE 411 is low, 5GNR gNodeB 427 transfers a handover command to UE 411 directing UE 411 to attach to 5GNR gNodeB 430 and to remove UE capabilities for frequency bands of 5GNR gNodeB 430 and 5G MMW node 431 that have a high channel bandwidth. UE 411 detaches from 5GNR gNodeB 427 and 5G RAT node 428. UE 411 attaches to 5GNR gNodeB 430 and transfers its UE updated UE capabilities to 5GNR gNodeB 430. 5GNR gNodeB 430 attaches UE 411 to low-bandwidth frequency bands of itself and of 5G MMW node 430. 5GNR gNodeB 430 notifies 5GC AMF 445 of the attachment. 5GC AMF 445 directs 5GC SMF 447 to direct 5GC UPF 446 to serve UE 411 per the quality-of-service metrics and network addressing over 5GNR gNodeB 430 and 5G MMW node 431. 5GNR gNodeB 430 and 5G MMW node 431 exchange user data with UE 411.

In some examples, 5GNR gNodeB 427 and 5GNR gNodeB 430 perform dynamic bandwidth sharing. Dynamic bandwidth sharing comprises transferring resource blocks between different frequency channels. For example, 5GNR gNodeB 427 may transfer resource blocks from a frequency channel used by 5GNR gNodeB 427 to a frequency channel used by 5G RAT node 428 to increase the frequency channel size for 5GNR gNodeB 430. Typically, 5GNR gNodeB 427 and 5GNR gNodeB 430 will perform dynamic bandwidth sharing when heavily loaded.

In some examples, UEs 411 determines to remove UE capabilities from its UE capabilities list as done by 5GNR gNodeB 427. UE 411 wirelessly receives System Information Blocks (SIBs) broadcast from 5GNR gNodeB 430. The SIBs characterize UE loads for the available frequency bands of EN-DC access node 429. UE 411 determines which frequency bands of EN-DC access node 429 are overloaded based on the percentage of used resource blocks in each of the available frequency bands. When UE 411 receives a handover command from 5GNR gNodeB 427 to handover 5GNR gNodeB 430, UE 411 updates its UE capabilities list to remove UE capabilities for the overloaded frequency bands of EN-DC access node 429. UE 411 attaches to 5GNR gNodeB 430 and detaches from EN-DC access node 426. UE 411 reports its updated UE capabilities for the non-overloaded bands of EN-DC access node 429. 5GNR gNodeB 430 and 5G MMW node 431 exchange user data with UE 411 using the non-overloaded frequency bands based on the updated UE capabilities.

Advantageously, LTE eNodeB 421 effectively and efficiently hands over UE 410 based on the UE capabilities of UE 410. Moreover, 5GNR gNodeB 427 effectively and efficiently hands over UE 411 based on the UE capabilities of UE 411.

Figure 5:
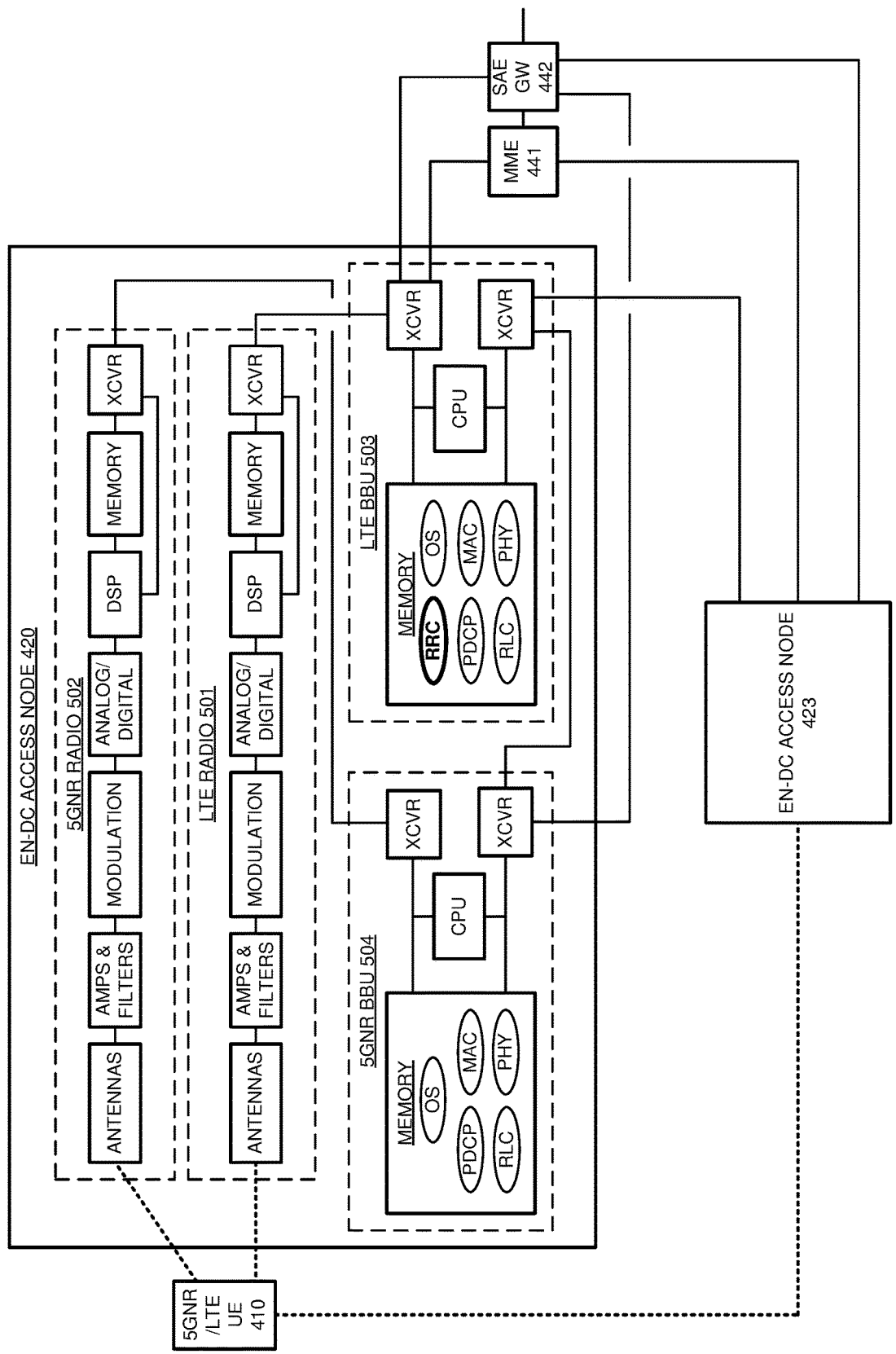
FIG. 5 illustrates an Evolved Universal Terrestrial Radio Access Network Dual Connectivity (EN-DC) access node to hand over a 5GNR/LTE UE based on UE capabilities.

FIG. 5 illustrates EN-DC access node 420 to hand over wireless UE 410 based on UE capabilities. EN-DC access node 420 is an example of source access node 120, although source access node 120 may differ. As shown in FIG. 4, EN-DC access node 420 comprises LTE eNodeB 421 and 5GNR gNodeB 422, however individual structures for LTE eNodeB 421 and 5GNR gNodeB 422 are omitted for clarity. EN-DC access node 420 comprises LTE radio 501, 5GNR radio 502, LTE Baseband Unit (BBU) 503, and 5GNR BBU 504. Radios 501-502 comprise antennas, amplifiers, filters, modulation, analog-to-digital interfaces, DSP, memory, and transceivers (XCVR) that are coupled over bus circuitry. BBUs 503-504 comprise memory, CPU, and transceivers that are coupled over bus circuitry. The memories in BBUs 503-504 store operating systems (OS) and network applications like Physical Layer (PHY), Media Access Control (MAC), Radio Link Control (RLC), Packet Data Convergence Protocol (PDCP), and Radio Resource Control (RRC). The CPUs in BBUs 503-504 execute the operating systems, PHYs, MACs, RLCs, PDCPs, and RRCs to exchange network signaling between UE 410 and MME 441 and to exchange user data between UE 410 and SAE GW 442.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 410 is wirelessly coupled to the antennas in LTE radio 501 over an LTE link. The transceiver in LTE radio 501 is coupled to a transceiver in LTE BBU 503 over Common Public Radio Interface (CPRI) links. A transceiver in LTE BBU 503 is coupled to MME 441 and SAE GW 442 over backhaul links. UE 410 is wirelessly coupled to the antennas in 5GNR radio 502 over an 5GNR link. The transceiver in 5GNR radio 502 is coupled to a transceiver in 5GNR BBU 504 over CPRI links. A transceiver in 5GNR BBU 504 is coupled to MME 441 and to SAE GW 442 over backhaul links. A transceiver in LTE BBU 503 is coupled to a transceiver in 5GNR BBU 504 over X2 links. UE is wirelessly coupled to EN-DC access node 423 over wireless links. A transceiver in LTE BBU 503 is coupled to EN-DC access node 423 over X2 links.

In operation, UE 410 wirelessly attaches to LTE antennas in LTE radio 501. The LTE antennas in LTE radio 501 receive wireless LTE signals from UE 410 that transport Uplink (UL) LTE signaling, UL LTE data. The UL signaling indicates UE capabilities for UE 410. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the capabilities of UE 410, to MME 441 over the backhaul links. MME 441 authenticates and authorizes 5GNR service for UE 410. In response to the authentication and authorization, MME 441 generates a A3 measurement object specifying frequency bands for UE 410 to measure. In LTE BBU 503, the LTE RRC receives the DL S1-MME signaling including the A3 measurement object from MME 441. The LTE PDCP transfers the UL LTE data to LTE SAE GW 442 over the backhaul links. The LTE PDCP receives DL LTE data from SAE GW 442.

The LTE network applications process the new DL LTE signaling and the DL LTE data to generate corresponding DL LTE symbols that carry the DL LTE signaling, DL LTE data, and the A3 measurement object. In LTE radio 501, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and A3 measurement object to UE 410.

In response to the A3 measurement object, UE 410 measures the signal strength of the reference signal for LTE BBU 503 and the signal strength of the reference signal for EN-DC access node 423. UE 410 generates a measurement report that characterizes the received signal strength for LTE BBU 503 and the received signal strength for EN-DC access node 423. UE 410 transfers the measurement report to LTE BBU 503 over LTE radio 501. The LTE RRC in LTE BBU 503 compares the received signal strength for LTE BBU 503 and the received signal strength for EN-DC access node 423. The LTE RRC in BBU 503 determines to hand over UE 410 to 5GNR BBU 504 based on the signal strengths. For example, the LTE RRC in BBU 503 may determine the received signal strength for LTE BBU 503 is below a handover threshold and the received signal strength for EN-DC access node 423 is above a handover threshold and responsively determine to hand over UE 410. In some examples, the LTE RRC may apply the signal strengths to an A3 threshold to determine to handover UE 410.

The LTE RRC in BBU 503 transfers a handover request to EN-DC access node 423 to hand over UE 410 over X2 links. The handover request indicates the UE capabilities of UE 410. The handover request typically includes radio bearer information and security key information for UE 410 to attach to EN-DC access node 423. EN-DC access node 423 acknowledges the hand over request and transfers UE loads for its frequency bands that correspond to the UE capabilities. For example, the UE capabilities may indicate UE 410 can use a 5GNR frequency band of EN-DC access node 423 and EN-DC access node 423 responsively transfers the UE load for 5GNR frequency band to the LTE RRC in BBU 503. The LTE RRC in BBU 503 determines overloaded frequency bands for EN-DC access node 423. For example, the LTE RRC in BBU 503 may determine the percentage of occupied resource blocks in the frequency bands of EN-DC access node 423 to determine which frequency bands are overloaded. The LTE RRC in BBU 503 determines which of the UE capabilities of UE 410 are for the overloaded frequency bands of EN-DC access node 423.

The LTE RRC in BBU 503 transfers a handover command to UE 410 over radios LTE 501 that directs UE 410 to attach to EN-DC access node 423 and to update its UE capabilities list to remove UE capabilities for overloaded/heavily loaded frequency bands of EN-DC access node 423. The LTE PDCP in BBU 503 transfers user data for UE 410 to EN-DC access node 423. EN-DC access node 423 buffers the user data for UE 410 received from the LTE PDCP. UE 410 updates its UE capabilities list in response to the handover command. UE 410 detaches from LTE BBU 503 and 5GNR BBU 504. UE 410 attaches to EN-DC access node 423 and transfers its updated UE capabilities to EN-DC access node 423. In response to the updated UE capabilities, EN-DC access node 423 attaches UE 410 to its non-overloaded frequency bands. EN-DC access node 423 transfers the buffered user data to UE 410. EN-DC access node 423 notifies MME 441 of the handover. LTE MME 441 directs LTE SAE GW 442 to serve UE 410 over EN-DC access node 423. In response, LTE SAE GW 442 exchanges user data for UE 410 with EN-DC access node 423. EN-DC access node 423 exchanges the user data with UE 410 on the non-overloaded frequency bands.

In some examples, the LTE RRC hands over UE 410 to EN-DC access node 423 based on the power head room of UE 410. Power head room comprises the difference between a UE's current output power and maximum output power. The LTE RRC in BBU 503 directs UE 410 to measure received signal strength for LTE BBU 503 and EN-DC access node 423 and to report its power head room. LTE radio 501 receives a measurement report from UE 410 that characterizes the signal strengths and the power head room for UE 410 and transfers the measurement report to the LTE RRC in BBU 503. The LTE RRC in BBU 503 determines to hand over UE 410 to EN-DC access node 423 based on the signal strengths. The LTE RRC in BBU 423 transfers a hand over request to EN-DC access node 423. EN-DC access node 423 acknowledges the hand over request and transfers frequency band sizes for each of its frequency bands to the LTE RRC. The LTE RRC determines which frequency bands of EN-DC access node 423 have a high channel bandwidth. When the power head room of UE 410 is low, the LTE RRC transfers a handover command to UE 410 over LTE radio 501 that directs UE 410 to attach to EN-DC access node 423 and to remove UE capabilities for frequency bands of EN-DC access node 423 that have a high channel bandwidth. UE 410 attaches to EN-DC access node 423 and transfers its UE capabilities to EN-DC access node 423. UE 410 detaches from LTE BBU 503 and 5GNR BBU 504. EN-DC access node 423 notifies LTE MME 441 of the handover and LTE MME 441 directs SAE GW 442 to serve UE 410 over EN-DC access node 423. In response, LTE SAE GW 442 exchanges user data for UE 410 with EN-DC access node 423. EN-DC access node 423 serves UE 410 on frequency bands that have a low bandwidth based on the updated UE capabilities. EN-DC access node 423 exchanges the user data with UE 410.

Figure 6:
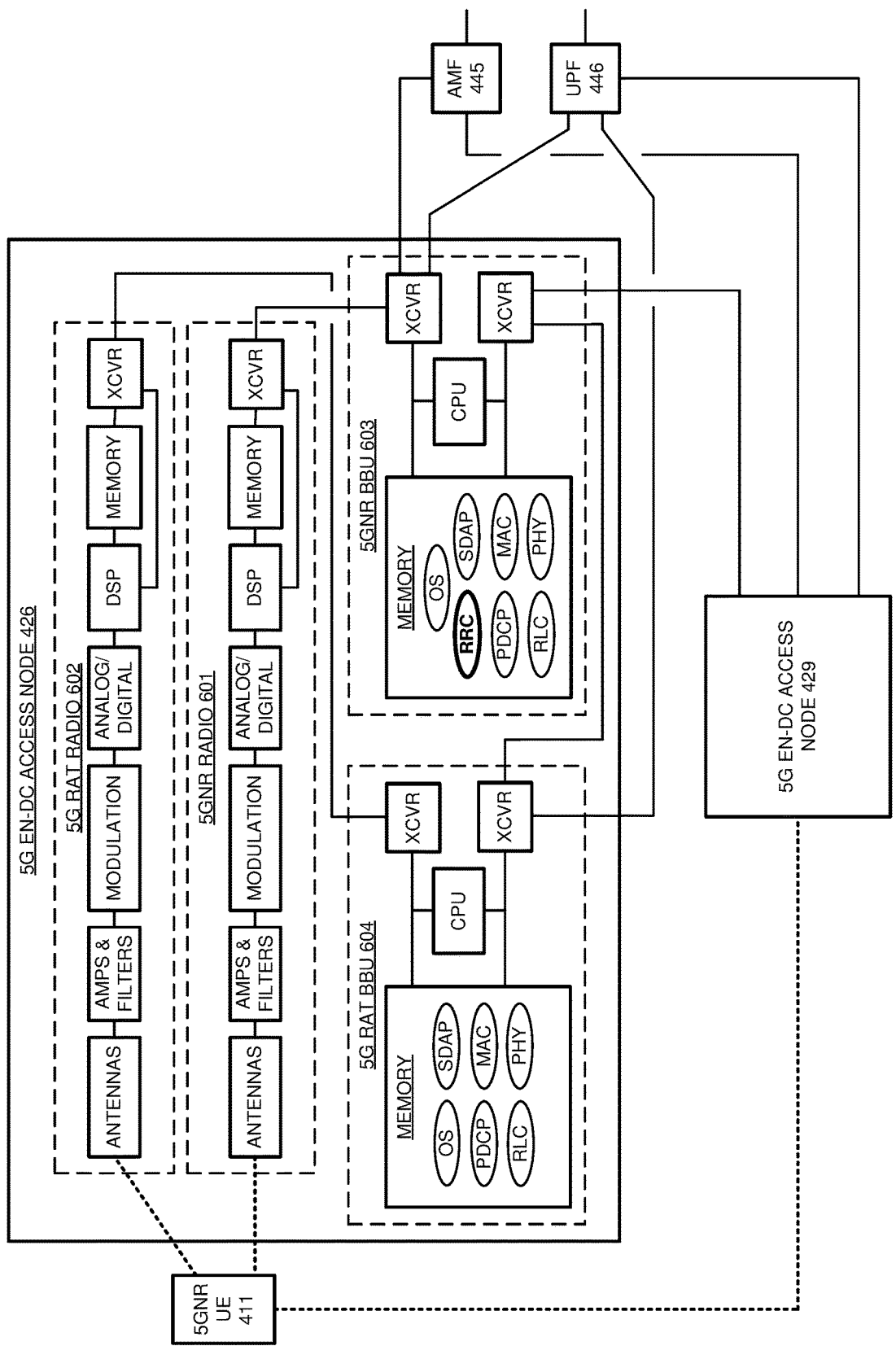
FIG. 6 illustrates a Fifth Generation (5G) EN-DC access node to hand over a 5GNR UE based on UE capabilities.

FIG. 6 illustrates 5G EN-DC access node 426 hand over 5GNR UE 411 based on UE capabilities. EN-DC access node 426 is an example of source access node 120, although access node 120 may differ. EN-DC access node 426 comprises 5GNR radio 601, 5G RAT radio 602, 5GNR BBU 603, and 5G RAT BBU 604. Radios 601-602 comprise antennas, amplifiers, filters, modulation, analog-to-digital interfaces, DSP, memory, and transceivers that are coupled over bus circuitry. UE 411 is wirelessly coupled to the antennas in 5GNR radio 601 over a 5GNR link and to antennas in 5G RAT radio 602 over a 5G RAT link. The transceiver in 5GNR radio 601 is coupled to a transceiver in 5GNR BBU 603 over CPRI links. The transceiver in 5G RAT radio 602 is coupled to a transceiver in 5G RAT BBU 604 over CPRI links. A transceiver in 5GNR BBU 603 is coupled to AMF 445 and UPF 446 over backhaul links. A transceiver in 5GNR BBU 603 is coupled to 5GNR gNodeB 430 of X2 links. A transceiver in 5G RAT BBU 604 is coupled to UPF 446 over backhaul links. BBUs 603-604 comprise memories, CPUs, and transceivers that are coupled over bus circuitry. The memories in BBUs 603-604 stores operating systems and network applications like PHY, MAC, RLC, PDCP, RRC, and Service Data Adaptation Protocol (SDAP). The CPUs in BBU 603-604 execute the operating systems, PHYs, MACs, RLCs, PDCPs, SDAPs, and RRCs to exchange network signaling with UE 411 and AMF 445 and to exchange user data between UE 411 and UPF 446.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, 5GNR UE 411 wirelessly attaches to 5GNR radio 601. In 5GNR radio 601, the antennas receive wireless 5GNR signals from 5GNR UE 411 that transport UL 5GNR signaling and UL 5GNR data. The 5G UL signaling from UE 411 indicates UE capabilities for UE 411. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC in 5GNR BBU 603 processes the UL 5GNR signaling and DL N2 signaling from AMF 445 to generate new UL N2 signaling and new DL 5GNR signaling. The 5GNR RRC transfers the new UL N2 signaling to AMF 445. The 5GNR SDAP in 5GNR BBU 603 transfers the UL 5GNR data to UPF 446 over backhaul links.

In 5GNR BBU 603, the 5GNR RRC receives the DL N2 signaling (including a 5GNR measurement object) from AMF 445. The 5GNR SDAP receives DL 5GNR data from UPF 446. The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling, DL 5GNR data, and 5GNR measurement object to 5GNR UE 411.

In response to the 5GNR measurement object, UE 411 measures the signal strength of the reference signal for 5GNR BBU 603 and the signal strength of the reference signal from EN-DC access node 429. UE 411 generates a measurement report that characterizes the received signal strength for 5GNR BBU 603 and the received signal strength of EN-DC access node 429 and transfers the measurement report to 5GNR BBU 603 over 5GNR radio 601. The 5GNR RRC in BBU 601 determines to hand over UE 411 to EN-DC access node 429 based on the signal strengths. For example, the 5GNR RRC may determine the received signal strength for 5GNR BBU 603 is below a handover threshold, determine the received signal strength for EN-DC access node 429 is above a handover threshold, and determine to hand over UE 411 based on the exceeded thresholds.

The 5GNR RRC in BBU 603 transfers a handover request to EN-DC access node 429 to hand over UE 411 over X2 links. The handover request indicates UE capabilities for UE 411. EN-DC access node 429 acknowledges the hand over request and transfers UE loads for its frequency bands that correspond to the UE capabilities of UE 411. The 5GNR RRC in BBU 603 determines which frequency bands of EN-DC access node 429 are overloaded frequency bands. For example, the 5GNR RRC may determine the percentage of occupied frequency blocks for each of the frequency bands to determine which frequency bands are overloaded. The 5GNR RRC determines which of the UE capabilities correspond to the overloaded frequency bands of EN-DC access node 429. For example, the 5GNR RRC in BBU 603 may determine UE 411 is capable of using an overloaded frequency band of EN-DC access node 423.

The 5GNR RRC in BBU 603 transfers a handover command to UE 411 over 5GNR radio 601 that directs UE 411 to update its UE capabilities list to remove UE capabilities for the overloaded frequency bands of EN-DC access node 429 and to attach to EN-DC access node 429. The 5GNR SDAP transfers user data for UE 411 to EN-DC access node 429 over X2 links. 5G EN-DC access node 429 buffers the user data received from the 5GNR SDAP. UE 411 updates its UE capabilities list to remove capabilities for the overloaded frequency bands. UE 411 detaches from BBUs 603-604. UE 411 attaches to EN-DC access node 429. UE 411 transfers its updated UE capabilities to EN-DC access node 429. EN-DC access node 429 transfers the buffered user data to UE 411. EN-DC access node 429 notifies 5GC AMF 445 of the attachment. 5GC AMF 445 directs 5GC SMF 447 to direct 5GC UPF 446 to serve UE 411 per the quality-of-service metrics and network addressing over EN-DC access node 429. 5GNR gNodeB 430 attaches UE 411 to its non-overloaded frequency bands based on the updated UE capabilities. 5G EN-DC access node 429 exchanges the user data with UE 411.

In some examples, the 5GNR RRC in BBU 603 hands over UE 411 to EN-DC access node 429 based on the power head room of UE 411. Power head room comprises the difference between a UE's current output power and maximum output power. The 5GNR RRC directs UE 411 to measure received signal strength for 5GNR BBU 603 and EN-DC access node 429 and to report its power head room. Th 5GNR RRC receives the measurement report from UE 411 that characterizes the signal strengths of 5GNR BBU 603 and EN-DC access node 429 and the power head room for UE 411. The 5GNR RRC determines to hand over UE 411 and transfers a hand over request to EN-DC access node 429. EN-DC access node 429 acknowledges the hand over request and transfers frequency band sizes for each of its frequency bands to the 5GNR RRC in BBU 603. The 5GNR RRC determines which frequency bands of EN-DC access node 429 have a high channel bandwidth. When the power head room of UE 411 is low, the 5GNR RRC 427 transfers a handover command to UE 411 that directs UE 411 to attach to EN-DC access node 429 and to remove UE capabilities for frequency bands of EN-DC access node 429 that have a high channel bandwidth. UE 411 detaches from BBUs 603-604 and attaches to EN-DC access node 429. UE 411 transfers its UE capabilities to EN-DC access node 429. 5G EN-DC access node 429 notifies 5GC AMF 445 of the attachment. 5GC AMF 445 directs 5GC SMF 447 to direct 5GC UPF 446 to serve UE 411 per the quality-of-service metrics and network addressing over EN-DC access node 429. EN-DC access node 429 attaches UE 411 to its low bandwidth frequency band based on the updated UE capabilities. EN-DC access node 429 exchanges the user data with UE 411.

Figure 7:
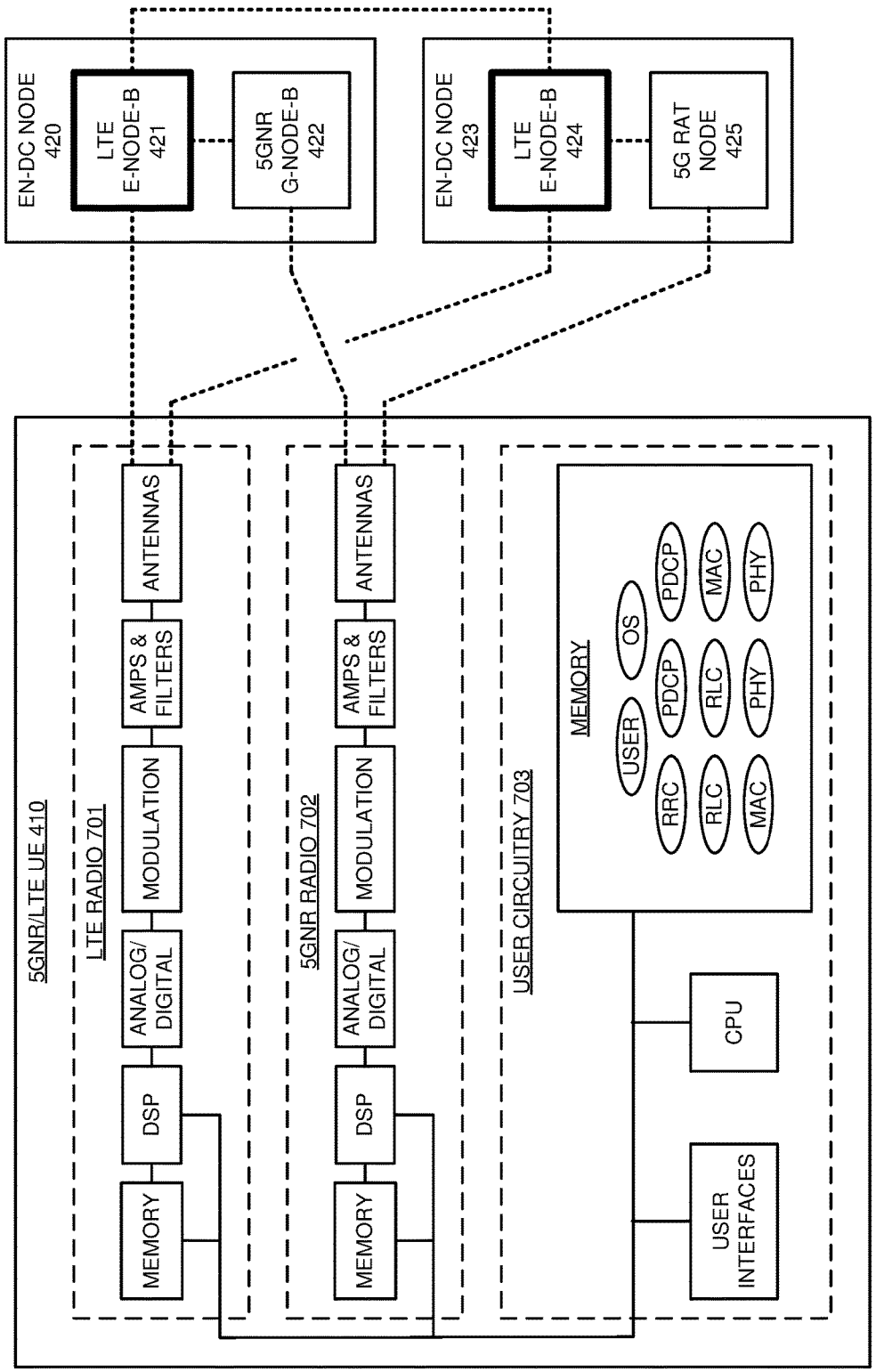
FIG. 7 illustrates the 5GNR/LTE UE that is handed over by the EN-DC access node based on UE capabilities.

FIG. 7 illustrates 5GNR/LTE UE 410 that is handed over by EN-DC access node 420 based on UE capabilities. 5GNR/LTE UE 410 is an example of UE 101, although UE 101 may differ. UE 410 comprises LTE radio 701, 5GNR radio 702, and user circuitry 703 that are coupled over bus circuitry. Radios 701-702 comprise antennas, amplifiers, filters, modulation, analog-to-digital interfaces, DSP, and memory that are coupled over bus circuitry. User circuitry 703 comprises user interfaces, CPU, and memory that are coupled over bus circuitry.

The antennas in radios 701 and 702 are wirelessly coupled to LTE eNodeB 421, 5GNR gNodeB 422, LTE eNodeB 424, and 5G RAT node 425. The user interfaces in user circuitry 703 comprise graphic displays, machine controllers, sensors, cameras, transceivers, and/or some other user components. The memory in user circuitry 703 stores an operating system, user applications (USER), and network applications (PHY, MAC, RLC, PDCP, and RRC). The CPU in user circuitry 703 executes the operating system and the user applications to generate and consume user data. The CPU in user circuitry 703 executes the operating system and the network applications to wirelessly exchange corresponding signaling and data with LTE eNodeB 421, 5GNR gNodeB 422, LTE eNodeB 424, and 5G RAT node 425 over radios 701 and 702.

In operation, the LTE RRC in UE 410 wirelessly attaches to LTE eNodeB 421 over antennas in LTE radio 701. The LTE RRC in UE 410 generates UL LTE signaling and UL LTE data. The UL signaling indicates UE capabilities for UE 410. The LTE network applications in UE 410 process the UL LTE signaling and the UL LTE data to generate corresponding UL LTE symbols that carry the UL LTE signaling and UL LTE data. The LTE DSP in LTE radio 701 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the UE capabilities) and UL LTE data for UE 410 to LTE eNodeB 421.

The LTE antennas in LTE radio 701 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates a A3 measurement object, APNs, QCIs, and network addresses from LTE eNodeB 421.

In response to the A3 measurement object, the LTE RRC in UE 410 directs the LTE PHY to measure signal strength of the reference signals from LTE eNodeB 421 and LTE eNodeB 424. The LTE PHY reports the signal strengths to the LTE RRC. The LTE RRC in UE 410 generates a measurement report that characterizes the signal strengths and transfers the measurement report to LTE eNodeB 421 over LTE radio 701. LTE eNodeB 421 determines to hand over UE 410 to LTE eNodeB 424 based on the measurement report. The LTE RRC in UE 410 receives a handover command from LTE eNodeB 421 over LTE radio 701. The handover command directs UE 410 to attach to LTE eNodeB 424 and update its UE capabilities list to remove UE capabilities for overloaded frequency bands of LTE eNodeB 424 and 5G RAT node 425. The LTE RRC in UE 410 removes UE capabilities for the overloaded frequency bands from its UE capabilities list. The LTE RRC in UE 410 attaches to LTE eNodeB 424 over LTE radio 701 and detaches from LTE eNodeB 421 and 5GNR gNodeB 422. The LTE RRC UE 410 transfers its updated UE capabilities list to LTE eNodeB 424. The LTE RRC receives instructions from LTE eNodeB 424 to attach to non-overloaded frequency bands for LTE eNodeB 424 and 5G RAT node 425. UE 410 exchanges user data with LTE eNodeB 424 over LTE radio 701 and 5G RAT node 425 over 5GNR radio 702 on non-overloaded frequency bands.

In some examples, LTE eNodeB 421 hands over UE 410 to LTE eNodeB 424 based on the power head room of UE 410. Power head room comprises the difference between a UE's current output power and the UE's maximum output power. The LTE RRC in UE 410 receives instructions to measure signal strength of the reference signals from LTE eNodeB 421 and LTE eNodeB 424 and to transfer the power head room for UE 410 to LTE eNodeB 421. The LTE RRC directs the LTE PHY to measure the signal strengths. The LTE PHY reports the signal strengths to the LTE RRC. The LTE RRC in UE 410 generates a measurement report that characterizes the signal strengths and the power head room and transfers the measurement report to LTE eNodeB 421 over LTE radio 701. LTE eNodeB 421 determines to hand over UE 410 to LTE eNodeB 424 based on the measurement report. When the power head room for UE 410 is low, the LTE RRC in UE 410 receives a handover command from LTE eNodeB 421 over LTE radio 701. The handover command directs UE 410 to attach to LTE eNodeB 424 and update its UE capabilities list to remove UE capabilities associated with high bandwidth frequency bands of LTE eNodeB 424 and 5G RAT node 425. The LTE RRC in UE 410 removes UE capabilities for the high-bandwidth frequency bands from its UE capabilities list. The LTE RRC in UE 410 attaches to LTE eNodeB 424 over LTE radio 701 and detaches from LTE eNodeB 421 and 5GNR gNodeB 422. The LTE RRC UE 410 transfers its updated UE capabilities list to LTE eNodeB 424. The LTE RRC receives instructions from LTE eNodeB 424 to attach to low-bandwidth frequency bands for LTE eNodeB 424 and 5G RAT node 425. UE 410 exchanges user data with LTE eNodeB 424 over LTE radio 701 and 5G RAT node 425 over 5GNR radio 702 on low-bandwidth frequency bands.

Figure 8:
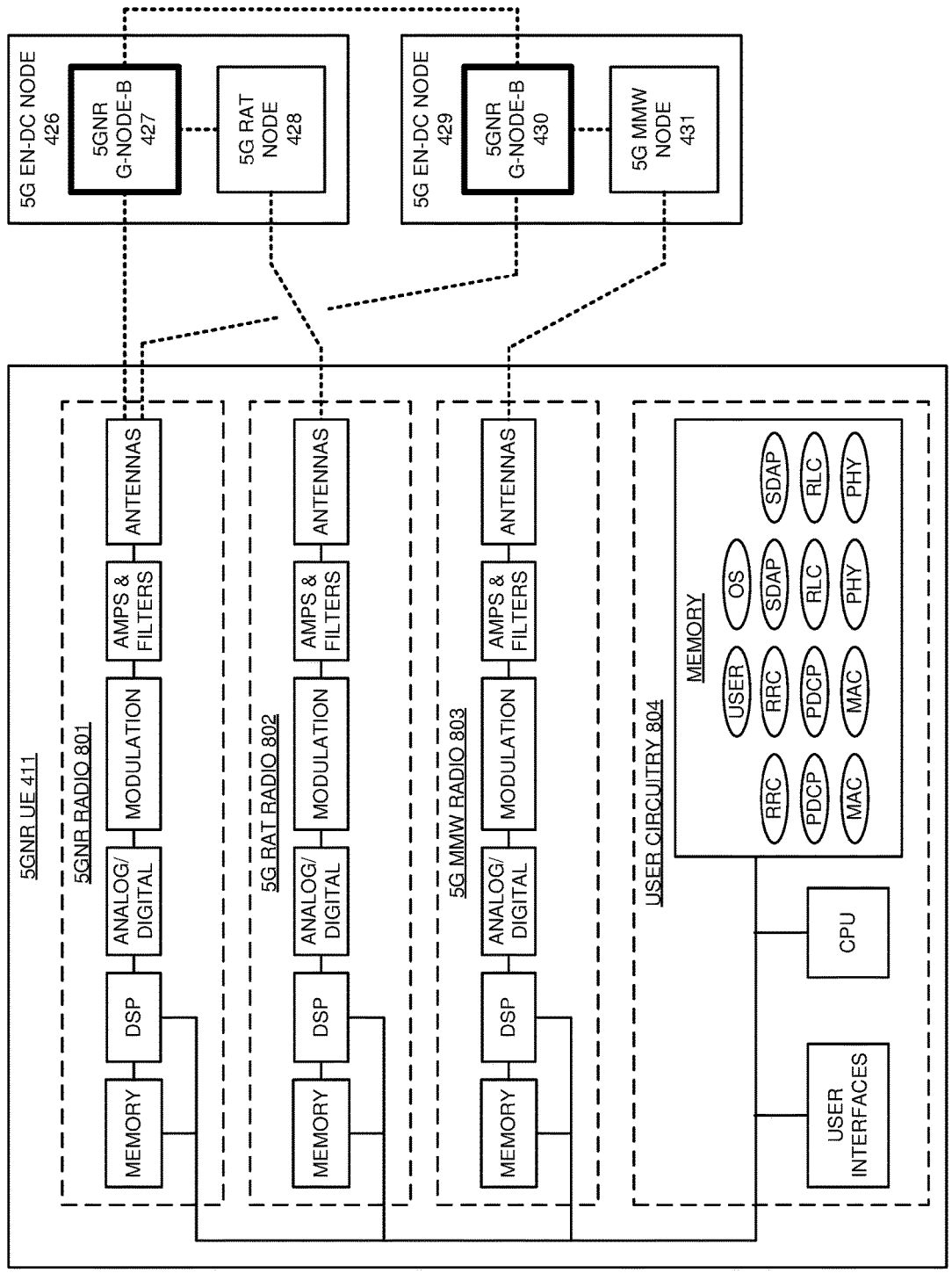
FIG. 8 illustrates the 5GNR UE that is handed over by the 5G EN-DC access node based on UE capabilities.

FIG. 8 illustrates 5GNR UE 411 that is handed over by 5GNR gNodeB 427 based on UE capabilities. 5GNR UE 411 is an example of UE 101, although UE 101 may differ. UE 411 comprises 5GNR radio 801, 5G RAT radio 802, 5G MMW radio 803, and user circuitry 804 that are coupled over bus circuitry. Radios 801-803 comprise antennas, amplifiers, filters, modulation, analog-to-digital interfaces, DSP, and memory that are coupled over bus circuitry. User circuitry 804 comprises user interfaces, CPU, and memory that are coupled over bus circuitry. The antennas in 5GNR radio 801 are wirelessly coupled to 5GNR gNodeB 427 and 5GNR gNodeB 430. The antennas in 5G RAT radio 802 are wirelessly coupled to 5G RAT node 428. The antennas in 5G MMW radio 803 are wirelessly coupled to 5G MMW node 431. The user interfaces in user circuitry 804 comprise graphic displays, machine controllers, sensors, cameras, transceivers, and/or some other user components. The memory in user circuitry 804 stores an operating system, user applications, and network applications (PHY, MAC, RLC, PDCP, SDAP, and RRC). The CPU in user circuitry 804 executes the operating system and the user applications to generate and consume user data. The CPU in user circuitry 804 executes the operating system and the network applications to wirelessly exchange corresponding signaling and data with 5GNR gNodeB 427 and 5GNR gNodeB 430 over 5GNR radio 801, with 5G RAT node 428 over 5G RAT radio 802, and with 5G MMW node 431 over 5G MMW radio 803.

In operation, the 5GNR RRC in UE 411 wirelessly attaches to 5GNR gNodeB 427 over antennas in 5GNR radio 801. The 5GNR RRC generates 5GNR signals that transport UL 5GNR signaling and UL 5GNR data. The 5GNR signaling indicates 5G capabilities for UE 411 and the location of UE 411. The 5GNR network applications in UE 411 process the UL 5GNR signaling and the UL 5GNR data to generate corresponding UL 5GNR symbols that carry the UL 5GNR signaling and UL 5GNR data. The 5GNR DSP in 5GNR radio 801 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating the 5G capabilities and location) and UL 5GNR data for UE 411 to 5GNR gNodeB 427.

The 5GNR antennas 5GNR radio 801 receive wireless DL signals that have DL 5GNR signaling, DL 5GNR data, and a 5GNR measurement object and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 411 execute the network applications to process the DL 5GNR symbols and recover the DL 5GNR signaling having the 5GNR measurement object, QoS levels, network addresses, and the like and the DL 5GNR data.

In response to the 5GNR measurement object, the 5GNR RRC in UE 411 directs the 5GNR PHY in UE 411 to measure signal strength of the reference signal for 5GNR gNodeB 427 and from 5GNR gNodeB 430. The 5GNR PHY reports the signal strengths to the 5GNR RRC. The 5GNR RRC transfers a measurement report that characterizes the signal strength for 5GNR gNodeB 427 and 5GNR gNodeB 430 to 5GNR gNodeB 427 over 5GNR radio 801. 5GNR gNodeB 427 determines to hand over UE 411 to 5GNR gNodeB 430 based on the signal strengths. The 5GNR RRC in UE 411 receives a handover command from 5GNR gNodeB 427 over 5GNR radio 801. The handover command directs UE 411 to attach to 5GNR gNodeB 430 and update its UE capabilities list to remove UE capabilities for the overloaded frequency bands of 5GNR gNodeB 430 and 5G MMW node 431. The 5GNR RRC in UE 411 removes UE capabilities for the overloaded frequency bands from its UE capabilities list. The 5GNR RRC in UE 411 attaches to 5GNR gNodeB 430 over 5GNR radio 801 and detaches from 5GNR gNodeB 427 and 5G RAT node 428. The 5GNR RRC in UE 411 transfers its updated UE capabilities list to 5GNR gNodeB 430. The 5GNR RRC receives instructions from 5GNR gNodeB 430 to attach to non-overloaded frequency bands for 5GNR gNodeB 430 and 5G RAT node 425. UE 411 exchanges user data with 5GNR gNodeB 430 over 5GNR radio 801 and 5G MMW node 431 over 5G MMW radio 803 on non-overloaded frequency bands.

In some examples, 5GNR gNodeB 427 hands over UE 411 to 5GNR gNodeB 430 based on the power head room of UE 411. Power head room comprises the difference between a UE's current output power and the UE's maximum output power. The 5GNR RRC in UE 411 receives instructions to measure signal strength of the reference signals from 5GNR gNodeB 427 and 5GNR gNodeB 430 and to transfer the power head room for UE 411 to 5GNR gNodeB 427. The 5GNR RRC directs the 5GNR PHY to measure the signal strengths. The 5GNR PHY measures the signal strengths and reports the signal strengths to the 5GNR RRC. The 5GNR RRC in UE 411 generates a measurement report that characterizes the signal strengths and the power head room and transfers the measurement report to 5GNR gNodeB 427 over 5GNR radio 801. 5GNR gNodeB 427 determines to hand over UE 411 to 5GNR gNodeB 430 based on the measurement report. When the power head room for UE 411 is low, the 5GNR RRC in UE 411 receives a handover command from 5GNR gNodeB 427 over 5GNR radio 801. The handover command directs UE 411 to attach to 5GNR gNodeB 430 and update its UE capabilities list to remove UE capabilities associated with high bandwidth frequency bands of 5GNR gNodeB 430 and 5G MMW node 431. The 5GNR RRC in UE 411 removes UE capabilities for the high bandwidth frequency bands from its UE capabilities list. The 5GNR RRC in UE 411 attaches to 5GNR gNodeB 430 over 5GNR radio 801 and detaches from 5GNR gNodeB 427 and 5G RAT node 428. The 5GNR RRC in UE 411 transfers its updated UE capabilities list to 5GNR gNodeB 430. The 5GNR RRC receives instructions from 5GNR gNodeB 430 to attach to non-overloaded frequency bands for 5GNR gNodeB 430 and 5G MMW node 431. UE 411 exchanges user data with 5GNR gNodeB 430 over 5GNR radio 801 and with 5G MMW node 431 over 5G MMW radio 803 on the non-overloaded frequency bands.

Figure 9:
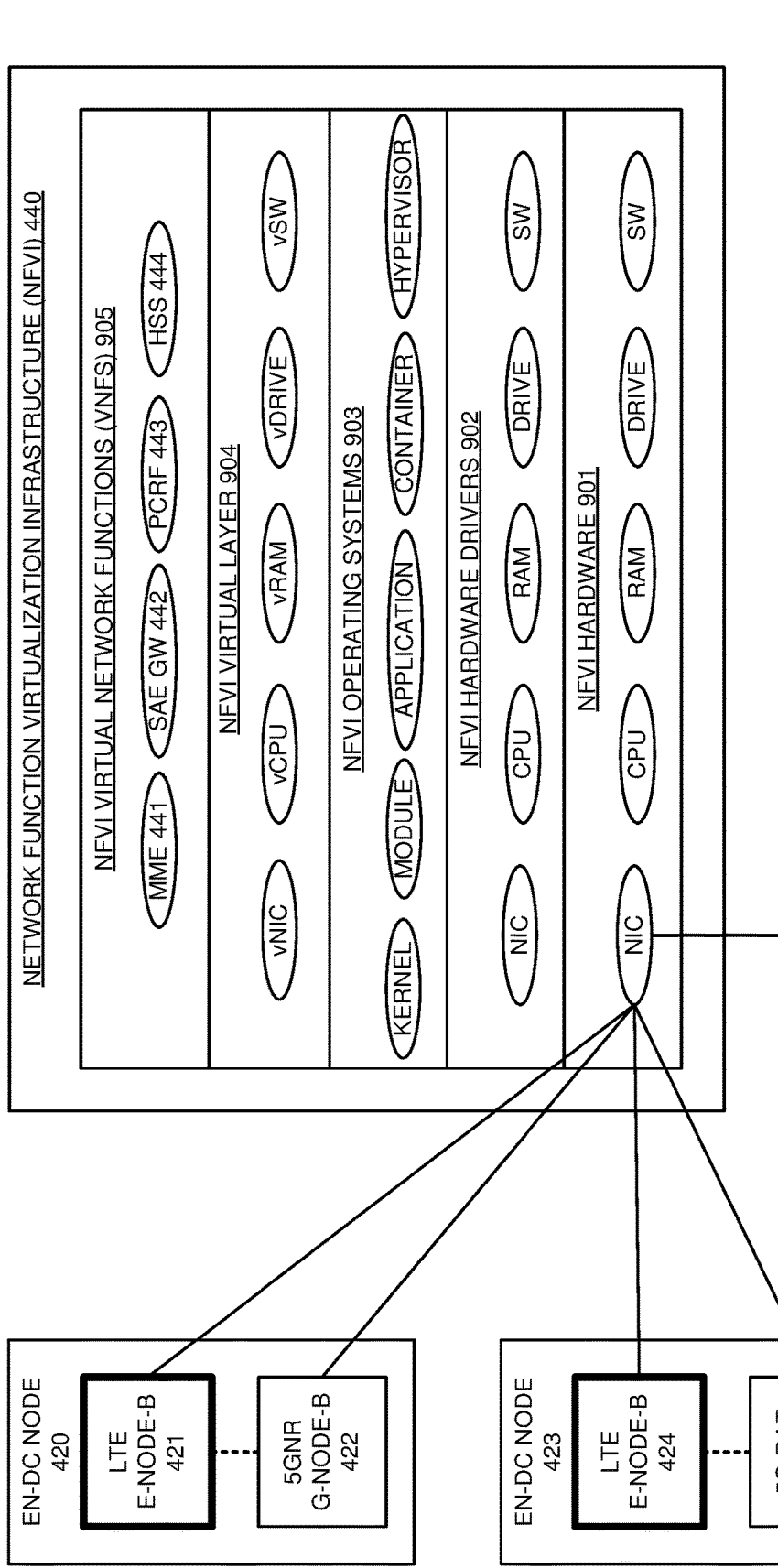
FIG. 9 illustrates a Network Function Virtualization Infrastructure (NFVI) to hand over wireless UEs based on UE capabilities.

FIG. 9 illustrates Network Function Virtualization Infrastructure (NFVI) 440 to hand over UE 410 based on UE capabilities. NFVI 440 is an example of network elements 150, although network elements 150 may differ. NFVI 440 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NIC), CPU, RAM, flash/disk drives, and data switches (SW). NFVI hardware drivers 902 comprise software that is resident in the NIC, CPU, RAM, DRIVE, and SW. NFVI operating systems 903 comprise kernels, modules, applications, containers, hypervisors, and the like. NFVI virtual layer 904 comprises virtual NICs (vNIC), virtual CPUs (vCPU), virtual RAM (vRAM), virtual Drives (vDRIVE), and virtual Switches (vSW). NFVI VNFs 905 comprise MME 441, SAE GW 442, PCRF 443, and HSS 444. Other LTE VNFs and 5GC VNFs are typically present but are omitted for clarity. The NIC is coupled to EN-DC node 420, EN-DC node 423, and to external systems. NFVI hardware 901 executes NFVI hardware drivers 902, NFVI operating systems 903, NFVI virtual layer 904, and NFVI VNFs 905 to serve UE 410 over EN-DC node 420 and EN-DC node 423.

MME 441 receives S1-MME signaling from LTE eNodeB 421 that requests data services for UE 410 and indicates UE capabilities for UE 410. MME 441 interacts with HSS 444 to authenticate and authorize UE 410 for wireless data services that are represented by APNs. In response to the UE capabilities and the authorization, MME 441 generates a A3 measurement object for UE 410 that specifies frequencies for UE 410 to measure when handing over. In some examples, the A3 measurement object may specify additional parameters for UE 410 to measure when handing over. MME 441 transfers the APNs for UE 410 to SAE GW 442. SAE GW 442 interacts with PCRF 443 to select QCIs and network addresses for UE 410 based on the APNs. SAE GW 442 transfers the APNs, QCIs, and network addresses to MME 441. MME 441 transfers the APNs, QCIs, network addresses, and A3 measurement object for UE 410 to LTE eNodeB 421. MME 441 receives S1-MME signaling from LTE eNodeB 421 for UE 410. SAE GW 442 exchanges user data for UE 410 with external systems. SAE GW 442 exchanges the user data with LTE eNodeB 421 and 5GNR gNodeB 422. MME 441 receives S1-MME signaling from LTE eNodeB 421 indicating UE 410 is being handed over to LTE eNodeB 424. MME 441 receives S1-MME signaling from LTE eNodeB 424 requesting data services for UE 410. MME 441 directs SEA GW 442 to stop serving UE 410 over LTE eNodeB 421 and to serve UE 410 over LTE eNodeB 424 and 5G RAT node 425. MME 441 receives S1-MME signaling from LTE eNodeB 424 for UE 410. SAE GW 442 exchanges user data for UE 410 with external systems. SAE GW 442 exchanges the user data with LTE eNodeB 424 and 5G RAT node 425.

Figure 10:
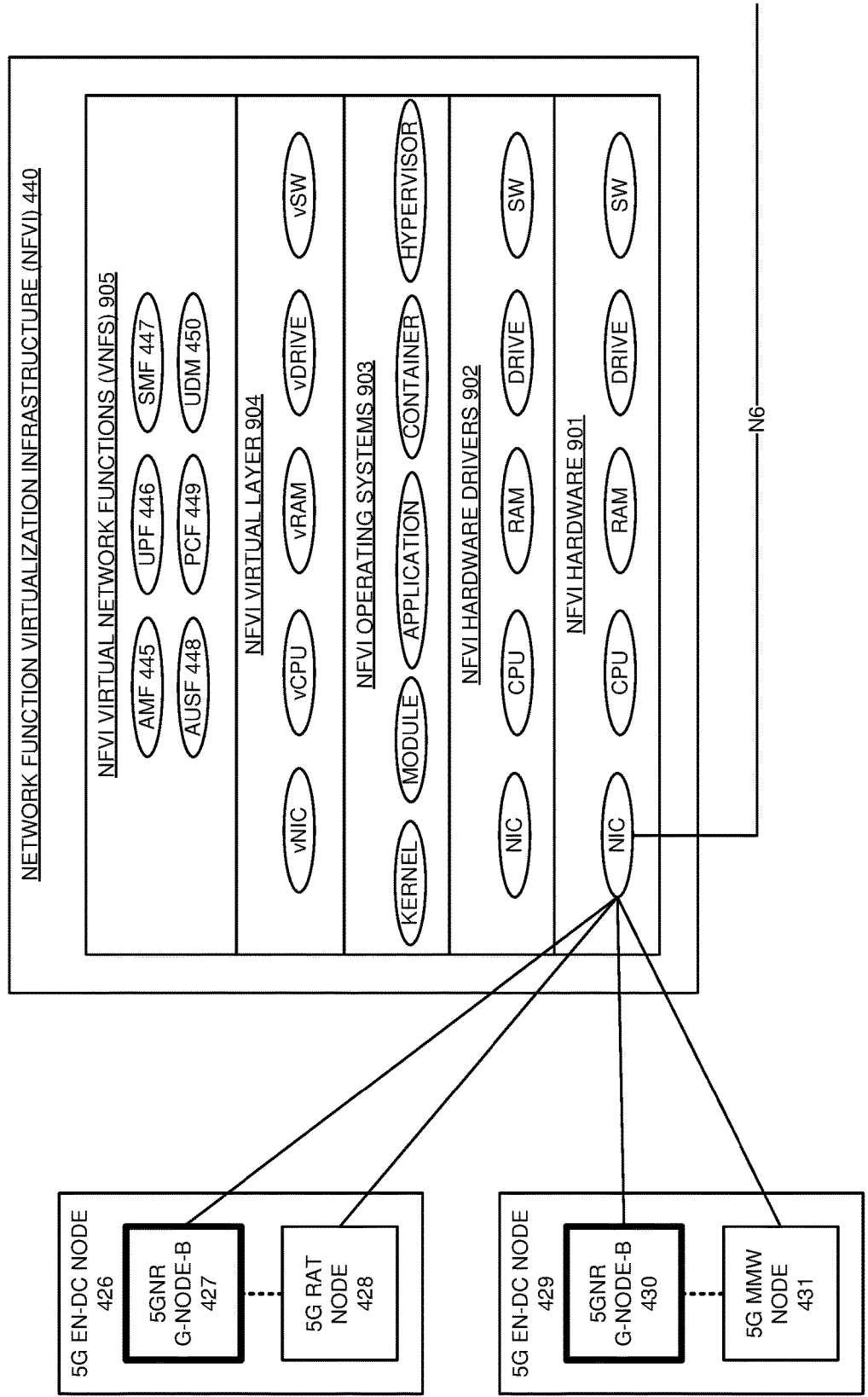
FIG. 10 illustrates an NFVI to hand over wireless UEs based on UE capabilities.

FIG. 10 illustrates Network Function Virtualization Infrastructure (NFVI) 440 to hand over UE 411 based on UE capabilities. NFVI 440 is an example of network elements 150, although network elements 150 may differ. NFVI 440 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NIC), CPU, RAM, flash/disk drives, and data switches (SW). NFVI hardware drivers 902 comprise software that is resident in the NIC, CPU, RAM, DRIVE, and SW. NFVI operating systems 903 comprise kernels, modules, applications, containers, hypervisors, and the like. NFVI virtual layer 904 comprises virtual NICs (vNIC), virtual CPUs (vCPU), virtual RAM (vRAM), virtual Drives (vDRIVE), and virtual Switches (vSW). NFVI VNFs 905 comprise AMF 445, UPF 446, SMF 447, AUSF 448, PCF 449, and UDM 450. Other LTE VNFs and 5GC VNFs are typically present but are omitted for clarity. The NIC is coupled to 5G EN-DC node 426, 5G EN-DC node 429, and to external systems. NFVI hardware 901 executes NFVI hardware drivers 902, NFVI operating systems 903, NFVI virtual layer 904, and NFVI VNFs 905 to serve UE 411 over 5G EN-DC node 426 and 5G EN-DC node 429.

AMF 445 receives N2 signaling from 5GNR gNodeB 427 that requests data service for UE 411 and indicates UE capabilities for UE 411. AMF 445 interacts with SMF 447, AUSF 448, PCF 449, and UDM 450 to authenticate and authorize 5GNR UE 411 for data services. AMF 445 generates a 5GNR measurement object responsive to the UE capabilities and the authorization that specifies frequencies for UE 411 to measure when handing over. In some examples, the 5GNR measurement object may specify additional parameters for UE 411 to measure when handing over. AMF 445 transfers quality-of-service metrics, network addressing, and the 5GNR measurement object for 5GNR UE 411 to 5GNR gNodeB 427. AMF 445 receives N2 signaling from 5GNR gNodeB 427 indicating the attachments. AMF 445 directs SMF 447 drive UPF 446 to serve UE 411 over 5GNR gNodeB 427 and 5G RAT node 428 per the quality-of-service metrics and network addressing. SMF 447 directs UPF 446 to serve UE 411 over 5GNR gNodeB 427 and 5G RAT node 428 per the quality-of-service metrics and network addressing. AMF 445 receives N2 signaling from 5GNR gNodeB 427 indicating UE 411 is being handed over to 5GNR gNodeB 430. AMF 445 receives N2 signaling from 5GNR gNodeB 430 requesting data services for UE 411. AMF 445 directs SMF 447 to drive UPF 446 to serve UE 411 over 5GNR gNodeB 430 and 5G MMW node 431 and to stop serving UE 411 over LTE eNodeB 427. AMF 445 receives N2 signaling from 5GNR gNodeB 430 for UE 411. UPF 446 exchanges user data for UE 411 with external systems. UPF 446 exchanges the user data with 5GNR gNodeB 430 and 5G MMW node 431.

Figure 11:
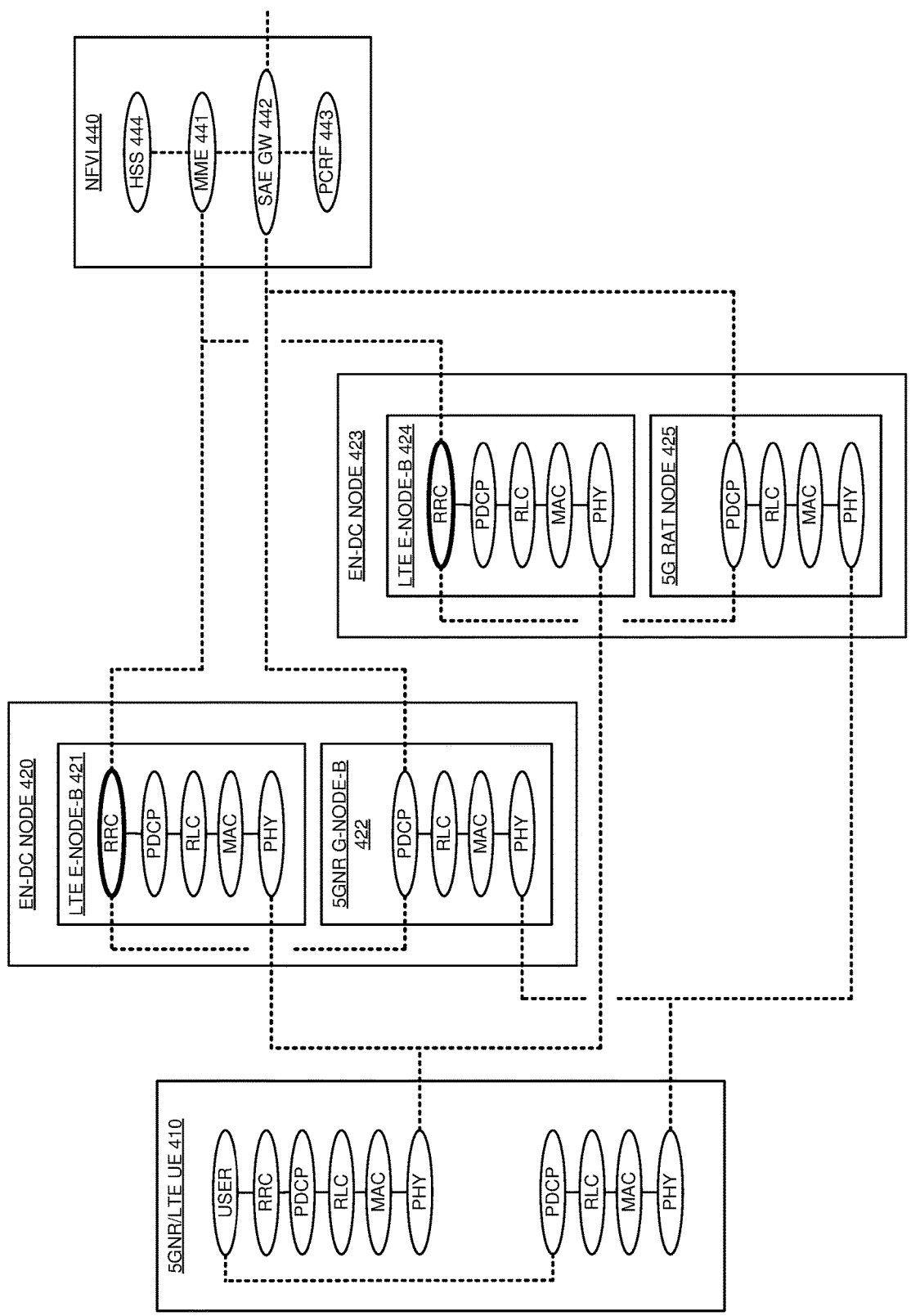
FIG. 11 illustrates an exemplary operation of the 5GNR/LTE UE, the EN-DC access node, and the NFVI to hand over the 5GNR/LTE UE based on UE capabilities.

FIG. 11 illustrates an exemplary operation of 5GNR/LTE UE 410, EN-DC access node 420, EN-DC access node 423, and NFVI 440 to hand over 5GNR/LTE UE 410 based on UE capabilities. In 5GNR/LTE UE 410, a user application requests data communication, and the LTE RRC in UE 410 attaches to the LTE RRC in LTE eNodeB 421 over the LTE PDCPs, RLCs, MACs, and PHYs. The LTE RRC in UE 410 indicates UE capabilities for UE 410 to the LTE RRC in LTE eNodeB 421. The LTE RRC in LTE eNodeB 421 transfers S1-MME signaling to MME 441 that requests data services and indicates the UE capabilities for UE 410.

MME 441 interacts with HSS 444 to authenticate and authorize UE 410 for wireless data services represented by APNs. In response to the 5G authorization and the 5G capabilities, MME 441 generates a A3 measurement object for UE 410 that specifies frequencies for UE 410 to measure when handing over. MME 441 transfers the APNs for UE 410 to SAE GW 442. SAE GW 442 interacts with PCRF 443 to select QCIs and network addresses for UE 410 based on the APNs. SAE GW 442 transfers the APNs, QCIs, and addresses to MME 441. MME 441 transfers the APNs, QCIs, network address, and the A3 measurement object for UE 410 to the LTE RRC in LTE eNodeB 421. The LTE RRC in LTE eNodeB 421 transfers the APNs, QCIs, network address, and A3 measurement object to the LTE RRC in UE 410 over the PDCPs, RLCs, MACs, and PHYs. SAE GW 442 exchanges the user data with the PDCP in LTE eNodeB 421 and the PDCP in 5GNR gNodeB 422. The PDCP in LTE eNodeB 421 and the PDCP in 5GRN gNodeB 422 exchange the user data with the PDCPs in UE 410 over the RLCs, MACs, and PHYs.

In response to the A3 measurement object, the RRC in UE 410 directs the LTE PHY in UE 410 to measure the signal strength of the reference signal from LTE eNodeB 421 and the signal strength of the reference signal from LTE eNodeB 424. The RRC in UE 410 generates a measurement report that characterizes the received signal strength of LTE eNodeB 421 and the received signal strength of LTE eNodeB 424 and transfers the measurement report to the LTE RRC in LTE eNodeB 421 over the PDCPs, RLCs, MACs, and PHYs. The LTE RRC in LTE eNodeB 421 determines to hand over UE 410 to LTE eNodeB 424 based on the signal strengths. The LTE RRC in LTE eNodeB 421 transfers a handover request to the LTE RRC in LTE eNodeB 424 to hand over UE 410. The handover request indicates the UE capabilities of UE 410. The LTE RRC LTE eNodeB 424 acknowledges the hand over request and transfers UE loads for its frequency bands that correspond to the UE capabilities and UE loads for the frequency bands of 5G RAT node 425 that correspond to the UE capabilities. The LTE RRC in LTE eNodeB 421 determines overloaded frequency bands for LTE eNodeB 424. The LTE RRC in LTE eNodeB 421 determines which of the UE capabilities correspond to the overloaded frequency bands of LTE eNodeB 424 and 5G RAT node 425.

The LTE RRC in LTE eNodeB 421 transfers a handover command to the RRC in UE 410 over the PDCPs, RLCs, MACs, and PHYs. The handover command directs UE 410 to attach to LTE eNodeB 424 and to update its UE capabilities list to remove UE capabilities for the overloaded frequency bands of LTE eNodeB 424 and 5G RAT node 425. The LTE RRC in LTE eNodeB 421 directs the LTE RRC in LTE eNodeB 424 to serve UE 410. The LTE RRC in UE 410 updates its UE capabilities list in response to the handover command. The RRC in UE 410 attaches to the LTE RRC LTE eNodeB 424 over the PDCPs, RLCs, MACs, and PHYs. The PDCP in UE 410 attaches to the PDCP in 5G RAT node 425 over the RLCs, MACs, and PHYs. The RRC in UE 410 detaches from LTE eNodeB 421 and the PDCP in UE 410 detaches from the PDCP in 5GNR gNodeB 422. The RRC in UE 410 transfers its updated UE capabilities to LTE eNodeB 424 over the PDCPs, RLCs, MACs, and PHYs. The LTE RRC in LTE eNodeB 424 notifies LTE MME 441 of the handover and LTE MME 441 directs SAE GW 442 to serve UE 410 over LTE eNodeB 424 and 5G RAT node 425. In response, LTE SAE GW 442 exchanges user data for UE 410 with LTE eNodeB 424 and 5G RAT node 425. LTE eNodeB 424 and 5G RAT node 425 exchange the user data with UE 410 over the PDCPs, RLCs, MACs, and PHYs.

In some examples, LTE eNodeB 421 hands over UE 410 to LTE eNodeB 424 based on the power head room of UE 410. The LTE RRC in LTE eNodeB 421 directs UE 410 to report its power head room. The LTE RRC in LTE eNodeB 421 receives a measurement report from UE 410 that characterizes the signal strengths of LTE eNodeBs 421 and 424 and the power head room for UE 410. The LTE RRC in LTE eNodeB 421 determines to hand over UE 410 and transfers a hand over request to the LTE RRC in LTE eNodeB 424. The LTE RRC in LTE eNodeB 424 acknowledges the hand over request and transfers frequency band sizes for each of its frequency bands and the frequency bands of 5G RAT node 425 to the LTE RRC in LTE eNodeB 421. The LTE RRC in LTE eNodeB 421 determines which frequency bands of LTE eNodeB 424 and 5G RAT node 425 have a high channel bandwidth. When the power head room of UE 410 is low, the LTE RRC in LTE eNodeB 421 transfers a handover command to the RRC in UE 410. The handover command directs UE 410 to attach to LTE eNodeB 424 and to remove UE capabilities for frequency bands of LTE eNodeB 424 and 5G RAT node 425 that have a high channel bandwidth. The RRC in UE 410 attaches to the LTE RRC in LTE eNodeB 424 and transfers its updated UE capabilities to LTE eNodeB 424. The LTE RRC in LTE eNodeB 424 notifies LTE MME 441 and LTE MME 441 directs SAE GW 442 to serve UE 410 over LTE eNodeB 424 and 5G RAT node 425. In response, LTE SAE GW 442 exchanges user data for UE 410 with the PDCPs in LTE eNodeB 424 and 5G RAT node 425. LTE eNodeB 424 and 5G RAT node 425 serve UE 410 on low-bandwidth frequency bands.

Figure 12:
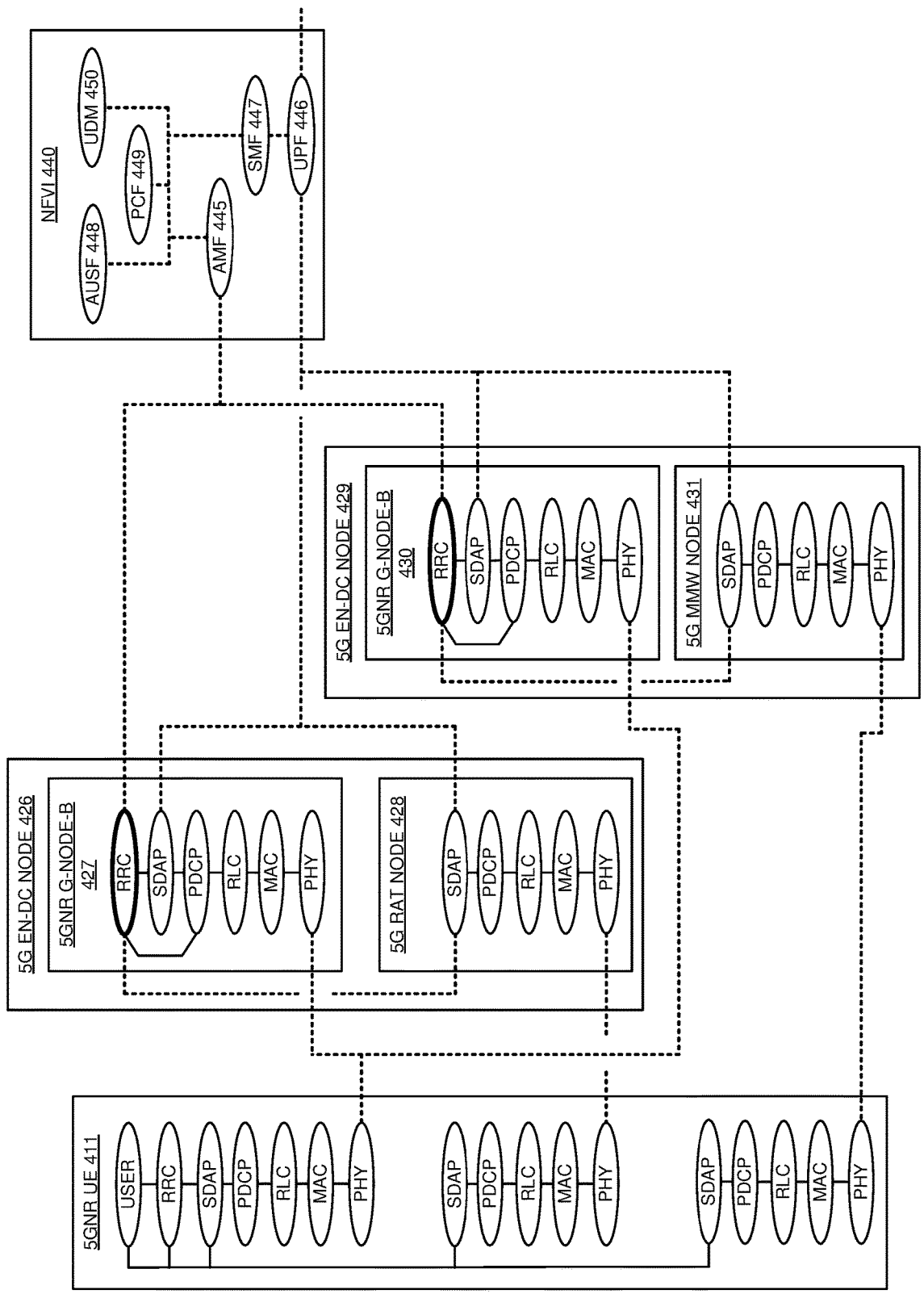
FIG. 12 illustrates an exemplary operation of the 5GNR UE, the 5GNR gNodeB, a 5G MMW access node, and the NFVI to hand over the 5GNR UE based on UE capabilities.

FIG. 12 illustrates an exemplary operation of UE 411, 5G EN-DC access node 426, 5G EN-DC access node 429, and NFVI 440 to hand over UE 411 based on UE capabilities. In 5GNR UE 411, a user application requests data communication, and the 5GNR RRC in UE 411 attach to the 5GNR RRC in 5GNR gNodeB 427 over the 5GNR SDAPs, PDCPs, RLCs, MACs, and PHYs. The 5GNR RRC in UE 411 indicates UE capabilities of UE 411 to the 5GNR RRC in 5GNR gNodeB 427. The 5GNR RRC in 5GNR gNodeB 427 sends a request for data services for 5GNR UE 411 in N2 signaling to AMF 445 over the backhaul links. AMF 445 interacts with SMF 447, AUSF 448, PCF 449, UDM 450, and typically other functions to authenticate and authorize 5GNR UE 411 for 5G data services. SMF 447 directs UPF 446 to serve UE 411 per the quality-of-service metrics and network addressing. AMF 445 generates a 5GNR measurement object for UE 411 responsive to the 5G authorization and 5G UE capabilities that specifies frequencies for UE 411 to measure when handing over. AMF 445 transfers quality-of-service metrics, network addressing, and the 5GNR measurement object for UE 411 to the 5GNR RRC in 5GNR gNodeB 427 in N2 signaling. The 5GNR RRC in 5GNR gNodeB 427 transfers the selected APNs, QCIs, network addresses, and 5GNR measurement object to the 5GNR RRC in UE 411 over the SDAPs, PDCPs, RLCs, MACs, and PHYs.

In response to the 5GNR measurement object, the 5GNR RRC in UE 411 directs the 5GNR PHY to measure the signal strength for 5GNR gNodeB 427 and for 5GNR gNodeB 430. The 5GNR PHY reports the signal strengths to the 5GNR RRC in UE 411. The 5GNR RRC generates a measurement report characterizing the signal strengths and wirelessly transfers the measurement report to the 5GNR RRC in 5GNR gNodeB 427 over the SDAPs, PDCPs, RLCs, MACs, and PHYs. The 5GNR RRC in 5GNR gNodeB 427 determines to hand over UE 411 to 5GNR gNodeB 430 based on the signal strengths.

The 5GNR RRC in 5GNR gNodeB 427 transfers a handover request to the 5GNR RRC in 5GNR gNodeB 430 to hand over UE 411. The handover request indicates the UE capabilities of UE 411. The 5GNR RRC in 5GNR gNodeB 430 acknowledges the hand over request and transfers UE loads for its frequency bands and the frequency bands of 5G MMW node 431 that correspond to the UE capabilities to the 5GNR RRC in 5GNR gNodeB 427. The 5GNR RRC in 5GNR gNodeB 427 determines which frequency bands of 5GNR gNodeB 430 and 5G MMW node 431 are overloaded frequency bands. The 5GNR RRC in 5GNR gNodeB 427 determines which of the UE capabilities correspond to the overloaded frequency bands of 5GNR gNodeB 430 and 5G MMW node 431.

The 5GNR RRC in 5GNR gNodeB 427 wirelessly transfers a handover command to UE 411 to attach to 5GNR gNodeB 430 over the SDAPs, PDCPs, RLCs, MACs, and PHYs. The handover command directs UE 411 to update its UE capabilities list to remove UE capabilities for the overloaded frequency bands of 5GNR gNodeB 430 and of 5G MMW node 431. The 5GNR RRC in 5GNR gNodeB 427 directs the 5GNR RRC in 5GNR gNodeB 430 to serve UE 411. The 5GNR RRC in 5GNR gNodeB 429 notifies AMF 445 of the attachment. AMF 445 directs 5GC SMF 447 to direct 5GC UPF 446 to serve UE 411 per the quality-of-service metrics and network addressing over 5GNR gNodeB 430 and 5G MMW node 431. The 5GNR RRC in UE 411 updates its UE capabilities list. The 5GNR RRC in UE 411 attaches to the 5GNR RRC in 5GNR gNodeB 430 and transfers its updated UE capabilities to 5GNR gNodeB 430 over the SDAPs, PDCPs, RLCs, MACs, and PHYs. The 5GNR RRC UE 411 detaches from 5GNR gNodeB 427. The 5GNR RRC in 5GNR gNodeB 430 serves UE 411 on non-overloaded frequency bands of 5GNR gNodeB 430 and 5G MMW node 431 based on the updated UE capabilities. The 5GNR SDAP in 5GNR gNodeB 430 and the MMW SDAP in 5G MMW node 431 exchange user data with UE 411 over the PDCPs, RLCs, MACs, and PHYs.

In some examples, 5GNR gNodeB 427 hands over UE 411 to 5GNR gNodeB 430 based on the power head room of UE 411. The 5GNR RRC in 5GNR gNodeB 427 directs UE 411 to report its power head room. The 5GNR RRC in 5GNR gNodeB 427 receives a measurement report from UE 411 that characterizes the signal strengths of 5GNR gNodeBs 427 and 430 and the power head room for UE 411 over the SDAPs, PDCPs, RLCs, MACs, and PHYs. The 5GNR RRC in 5GNR gNodeB 427 determines to hand over UE 411 and transfers a hand over request to the 5GNR RRC in 5GNR gNodeB 430. The 5GNR RRC in 5GNR gNodeB 430 acknowledges the hand over request and transfers frequency band sizes for each of its frequency bands and the frequency bands of 5G MMW node 431 to the 5GNR RRC in 5GNR gNodeB 427. The 5GNR RRC in 5GNR gNodeB 427 determines which frequency bands of 5GNR gNodeB 430 and 5G MMW node 431 have a high channel bandwidth. When the power head room of UE 411 is low, the 5GNR RRC in 5GNR gNodeB 427 transfers a handover command to the RRC in UE 411 over the SDAPs, PDCPs, RLCs, MACs, and PHYs. The handover command directs UE 411 to attach to 5GNR gNodeB 430 and to remove UE capabilities for frequency bands of 5GNR gNodeB 430 and 5G MMW node 431 that have a high channel bandwidth. The RRC in UE 411 attaches to the 5GNR RRC in 5GNR gNodeB 430 and transfers its updated UE capabilities to 5GNR gNodeB 430 over the SDAPs, PDCPs, RLCs, MACs, and PHYs. The 5GNR RRC in 5GNR gNodeB 427 notifies 5GNR MME 441 and 5GNR MME 441 directs SAE GW 442 to serve UE 411 over 5GNR gNodeB 430 and 5G MMW node 431. In response, 5GNR SAE GW 442 exchanges user data for UE 411 with the PDCPs in 5GNR gNodeB 430 and 5G MMW node 431. 5GNR gNodeB 430 and 5G MMW node 431 serve UE 411 on low-bandwidth frequency bands.

The wireless data network circuitry described above comprises computer hardware and software that form special-purpose network circuitry to hand over wireless UEs based on UE capabilities. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to hand over wireless UEs based on UE capabilities.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method for operating a source access node to hand over a wireless User Equipment (UE) to a target access node, the method comprising:
    a radio wirelessly receiving a measurement report from the UE that characterizes signal strength for the target access node, signal strength for the source access node, and UE capabilities for the UE and transferring the measurement report to a baseband circuitry;
    the baseband circuitry receiving the measurement report and determining to hand over the UE to the target access node based on the signal strengths, transferring a handover request to the target access node that indicates the UE capabilities, receiving UE load information from the target access node for the frequency bands that correspond to the UE capabilities, determining which frequency bands of the target access node comprise overloaded frequency bands, and determining which of the UE capabilities are for the overloaded frequency bands;
    the baseband circuitry generating a handover command that directs the UE to remove the UE capabilities that are associated with the overloaded frequency bands from a UE capabilities list and to attach to the target access node;
    the baseband circuitry transferring the handover command to the radio and transferring network signaling to the target access node to serve the UE; and
    the radio wirelessly transferring the handover command to the UE wherein the UE updates the UE capabilities list and attaches to a non-overloaded frequency band of the target access node and the target access node wirelessly exchanges user data with the UE.

2. The method of claim 1 wherein the baseband circuitry determining which frequency bands of the target access node comprise overloaded frequency bands comprises:
    the baseband circuitry determining an amount of resource blocks in the frequency bands and determining the fraction of used resource blocks in the frequency bands;
    the baseband circuitry determining a used resource block threshold; and
    the baseband circuitry determining which frequency bands exceed the used resource block threshold.

3. The method of claim 1 further comprising:
    the radio receiving a measurement report that characterizes the power head room for the UE, signal strength for the target access node, and signal strength for the source access node and transferring the measurement report to the baseband circuitry;
    the baseband circuitry receiving the measurement report, determining to hand over the UE based on the measurement report, and transferring a handover request to the target access node;
    the baseband circuitry receiving bandwidths for the frequency bands of the target access node from the target access node, determining a frequency band bandwidth threshold, and determining which frequency bands exceed the bandwidth threshold;
    when the power head room for the UE is low, the baseband circuitry generating a handover command directing the UE to remove UE capabilities for frequency bands that exceed the bandwidth threshold from a UE capabilities list and to attach to the target access node;
    the baseband circuitry transferring the handover command to the radio and transferring network signaling to the target access node to serve the UE; and
    the radio wirelessly transferring the handover command to the UE wherein the UE updates the UE capabilities list and attaches to a frequency band of the target access node that did not exceed the bandwidth threshold and the target access node wirelessly exchanges user data with the UE.

4. The method of claim 1 wherein the baseband circuitry receiving the measurement report and determining to hand over the UE, transferring the handover command, receiving the UE load information, determining the overloaded frequency bands, determining UE capabilities that are for the overloaded frequency bands, generating the handover command, transferring the handover command to the radio, and transferring network signaling to the target access node comprises the baseband circuitry executing a Fifth Generation New Radio (5GNR) Radio Resource Control (RRC) and the 5GNR RRC receiving the measurement report and determining to hand over the UE, transferring the handover request, receiving the UE load information, determining the overloaded frequency bands, determining UE capabilities for the overloaded frequency bands, generating the handover command, transferring the handover command to the radio, and transferring network signaling to the target access node.

5. The method of claim 1 wherein the baseband circuitry receiving the measurement report and determining to hand over the UE, transferring the handover command, receiving the UE load information, determining the overloaded frequency bands, determining UE capabilities that are for the overloaded frequency bands, generating the handover command, transferring the handover command to the radio, and transferring network signaling to the target access node comprises the baseband circuitry executing a Long Term Evolution (LTE) Radio Resource Control (RRC) and the LTE RRC receiving the measurement report and determining to hand over the UE, transferring the handover request, receiving the UE load information, determining the overloaded frequency bands, determining UE capabilities for the overloaded frequency bands, generating the handover command, transferring the handover command to the radio, and transferring network signaling to the target access node.

6. The method of claim 1 wherein the source access node comprises a first Evolved Universal Terrestrial Radio Access Network Dual Connectivity (EN-DC) access node and the target access node comprises a second EN-DC access node.

7. The method of claim 1 wherein the source access node comprises a first LTE eNodeB and the target access node comprises a second LTE eNodeB.

8. The method of claim 1 wherein the source access node comprises a first 5GNR gNodeB and the target access node comprises a second 5GNR gNodeB.

9. The method of claim 1 wherein the baseband circuitry transferring the handover request to the target access node and receiving the UE load information from the target access node comprises the baseband circuitry transferring the handover request to the target access node over an X2 link and receiving the UE load information over an X2 link.

10. The method of claim 1 wherein the baseband circuitry transferring the handover request to the target access node comprises the baseband circuitry transferring the handover request for delivery to the target access node to a Fifth Generation Core (5GC) Access and Mobility Management Function (AMF) wherein the 5GC AMF transfers the handover request to the target access node.

11. A source access node configured to hand over a wireless User Equipment (UE) to a target access node, the source access node comprising:
a radio configured to wirelessly receive a measurement report from the UE that characterizes signal strength for the target access node, signal strength for the source access node, and UE capabilities for the UE and transfer the measurement report to a baseband circuitry;
the baseband circuitry configured to receive the measurement report, determine to hand over the UE to the target access node based on the signal strengths, transfer a handover request to the target access node that indicates the UE capabilities, receive UE load information from the target access node for the frequency bands that correspond to the UE capabilities, determine which frequency bands of the target access node comprise overloaded frequency bands, and determine which of the UE capabilities are for the overloaded frequency bands;
the baseband circuitry configured to generate a handover command that directs the UE to remove the UE capabilities that are for the overloaded frequency bands from a UE capabilities list and to attach to the target access node;
the baseband circuitry configured to transfer the handover command to the radio and transfer network signaling to the target access node to serve the UE; and
the radio configured to wirelessly transfer the handover instructions to the UE wherein the UE updates the UE capabilities list and attaches to a non-overloaded frequency band of the target access node and the target access node wirelessly exchanges user data with the UE.

12. The source access node of claim 11 wherein the baseband circuitry configured to determine which frequency bands of the target access node comprise overloaded frequency bands comprises:
the baseband circuitry configured to determine an amount of resource blocks in the frequency bands and determine the fraction of used resource blocks in the frequency bands;
the baseband circuitry configured to determine a used resource block threshold; and
the baseband circuitry configured to determine which frequency bands exceed the used resource block threshold.

13. The source access node of claim 11 further comprising:
the radio configured to receive a measurement report that characterizes the power head room for the UE, signal strength for the target access node, and signal strength for the source access node and transfer the measurement report to the baseband circuitry;
the baseband circuitry configured to receive the measurement report, determining to hand over the UE based on the measurement report, and transfer a handover request to the target access node;
the baseband circuitry configured to receive bandwidths for the frequency bands of the target access node from the target access node, determine a frequency band bandwidth threshold, and determine which frequency bands exceed the bandwidth threshold;
when the power head room for the UE is low, the baseband circuitry configured to generate a handover command directing the UE to remove UE capabilities for frequency bands that exceed the bandwidth threshold from a UE capabilities list and to attach to the target access node;
the baseband circuitry configured to transfer the handover command to the radio and transfer network signaling to the target access node to serve the UE; and
the radio configured to wirelessly transfer the handover command to the UE wherein the UE updates the UE capabilities list and attaches to a frequency band of the target access node that did not exceed the bandwidth threshold and the target access node wirelessly exchanges user data with the UE.

14. The source access node of claim 11 wherein the baseband circuitry configured to receive the measurement report, determine to hand over the UE, transfer the handover command, receive the UE load information, determine the overloaded frequency bands, determine UE capabilities that are for the overloaded frequency bands, generate the handover command, transfer the handover command to the radio, and transfer network signaling to the target access node comprises the baseband circuitry configured to execute a Fifth Generation New Radio (5GNR) Radio Resource Control (RRC) and the 5GNR RRC configured to receive the measurement report, determine to hand over the UE, transfer the handover command, receive the UE load information, determine the overloaded frequency bands, determine UE capabilities that are for the overloaded frequency bands, generate the handover command, transfer the handover command to the radio, and transfer network signaling to the target access node.

15. The source access node of claim 11 wherein the baseband circuitry configured to receive the measurement report, determine to hand over the UE, transfer the handover command, receive the UE load information, determine the overloaded frequency bands, determine UE capabilities that are for the overloaded frequency bands, generate the handover command, transfer the handover command to the radio, and transfer network signaling to the target access node comprises the baseband circuitry configured to execute a Long Term Evolution (LTE) Radio Resource Control (RRC) and the LTE RRC configured to receive the measurement report, determine to hand over the UE, transfer the handover command, receive the UE load information, determine the overloaded frequency bands, determine UE capabilities that are for the overloaded frequency bands, generate the handover command, transfer the handover command to the radio, and transfer network signaling to the target access node.

16. The source access node of claim 11 wherein the source access node comprises a first Evolved Universal Terrestrial Radio Access Network Dual Connectivity (EN-DC) access node and the target access node comprises a second EN-DC access node.

17. The source access node of claim 11 wherein the source access node comprises a first LTE eNodeB and the target access node comprises a second LTE eNodeB.

18. The source access node of claim 11 wherein the source access node comprises a first 5GNR gNodeB and the target access node comprises a second 5GNR gNodeB.

19. The source access node of claim 11 wherein the baseband circuitry is configured to transfer the handover request to the target access node over an X2 link and receive the UE load information over the X2 link.

20. The source access node of claim 11 wherein the baseband circuitry is configured to transfer the handover request for delivery to the target access node to a Fifth Generation Core (5GC) Access and Mobility Management Function (AMF) wherein the 5GC AMF transfers the handover request to the target access node.

* * * * *